United States Patent [19]
Toriyama et al.

[11] Patent Number: 5,644,202
[45] Date of Patent: Jul. 1, 1997

[54] BRAKING CONTROL SYSTEM FOR AN ELECTRIC VEHICLE

[75] Inventors: Masayuki Toriyama; Kenji Tamaki; Satoshi Honda; Shoji Motodate; Yoshihiro Nakazawa; Takaaki Fujii; Shigemi Sasaki, all of Saitama, Japan

[73] Assignee: Honda Giken Kogyo Kabushiki Kaisha, Tokyo, Japan

[21] Appl. No.: 592,601

[22] Filed: Jan. 26, 1996

Related U.S. Application Data

[60] Continuation of Ser. No. 292,193, Aug. 18, 1994, abandoned, which is a division of Ser. No. 866,339, Apr. 9, 1992, Pat. No. 5,384,522.

[30] Foreign Application Priority Data

| Apr. 9, 1991 | [JP] | Japan | 3-103324 |
| Apr. 11, 1991 | [JP] | Japan | 3-105098 |
| Oct. 21, 1991 | [JP] | Japan | 3-299562 |

[51] Int. Cl.⁶ ..................... H02K 7/10
[52] U.S. Cl. ............ 318/369; 318/375; 318/376
[58] Field of Search ..................... 318/362–383

[56] References Cited

U.S. PATENT DOCUMENTS

| 3,710,216 | 1/1973 | Smith | 318/373 |
| 3,936,707 | 2/1976 | Yoshida et al. | 318/139 |
| 4,093,900 | 6/1978 | Plunkett | 318/370 |
| 4,263,988 | 4/1981 | Inaba et al. | 318/371 |
| 4,352,049 | 9/1982 | Franz, Jr. | 318/370 |
| 4,401,926 | 8/1983 | Morton et al. | |
| 4,463,289 | 7/1984 | Young | 318/723 |
| 4,544,868 | 10/1985 | Murty | 318/254 |
| 4,651,071 | 3/1987 | Imanaka | 318/371 |
| 5,170,105 | 12/1992 | Kumar | 318/362 |
| 5,208,741 | 5/1993 | Kumar | 318/375 |
| 5,281,900 | 1/1994 | Park | 318/139 |
| 5,436,540 | 7/1995 | Kumar | 318/375 |

FOREIGN PATENT DOCUMENTS

| 0311355 | 4/1989 | European Pat. Off. . |
| 0457594 | 11/1991 | European Pat. Off. . |
| 2159011 | 11/1985 | United Kingdom . |
| 2201309 | 8/1988 | United Kingdom . |

*Primary Examiner*—David S. Martin
*Attorney, Agent, or Firm*—Birch Stewart Kolasch & Birch, LLP

[57] ABSTRACT

A regenerative braking control system consumes energy generated in a period corresponding to an angle $\theta_1$ which starts in a half of a period of an AC voltage produced in a drive motor during the braking of the drive motor. The regenerative braking control system also consumes energy generated in a period corresponding to an angle $\theta_2$ that ends at the end of a half of a period of the AC voltage. The regenerative rate of braking control system utilizes a current induced in the driving coils of the drive motor at the end of the period corresponding to the angle $\theta_1$ to recharge a battery. By utilizing two periods to carry out the regenerative braking process, the recharging energy and the braking force can be controlled individually. Moreover, a controller monitors the electric control system to determine whether a malfunction is present. If a malfunction is detected, an electrical brake electrically brakes the drive motor. This electrical braking after the detection of a malfunction in the electrical system provides satisfactory controllability of the electric vehicle.

13 Claims, 26 Drawing Sheets

| θth\Ne | Ne0 | Ne1 | Ne2 | ----- | Ne15 |
|---|---|---|---|---|---|
| θth0 | D(0.0) | D(0.1) | D(0.2) | ----- | D(0.15) |
| θth1 | D(1.0) | D(1.1) | D(1.2) | | |
| θth2 | D(2.0) | | | | |
| ⋮ | ⋮ | | | D(X.Y) | |
| θth15 | D(15.0) | | | | D(15.15) |

FIG. 32
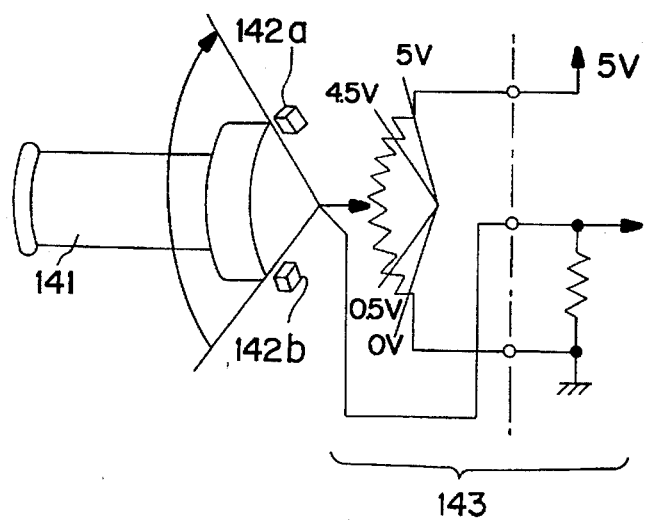
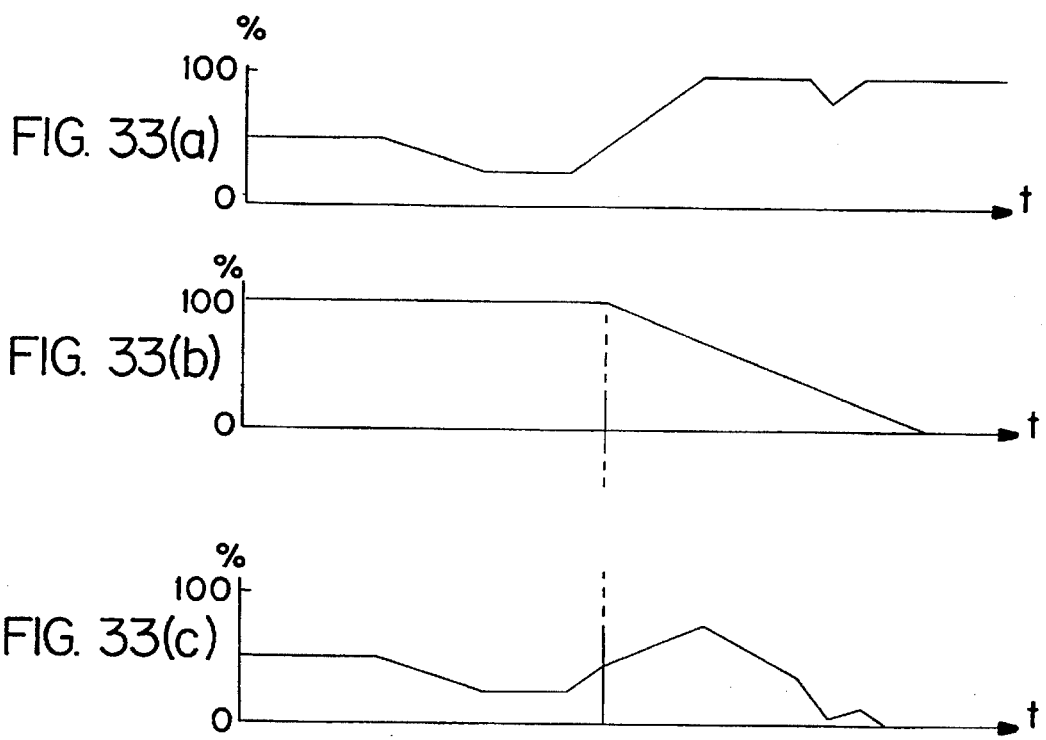

FIG. 35

| UH | VH | WH | |
|----|----|----|----|
| N | S | N | #0 |
| N | S | S | #1 |
| N | N | S | #2 |
| S | N | S | #3 |
| S | N | N | #4 |
| S | S | N | #5 |

FIG. 36

| SENSOR POSITIONS | DRIVING MODE | | | | | | |
| --- | --- | --- | --- | --- | --- | --- | --- |
| | #0 | #1 | #2 | #3 | #4 | #5 | — |
| U+ | ON | ON | OFF | OFF | OFF | OFF | OFF |
| U− | OFF | OFF | OFF | ON | ON | OFF | ON |
| V+ | OFF | OFF | ON | ON | OFF | OFF | OFF |
| V− | ON | OFF | OFF | OFF | OFF | ON | ON |
| W+ | OFF | OFF | OFF | OFF | ON | ON | OFF |
| W− | OFF | ON | ON | OFF | OFF | OFF | ON |

BRAKING CONTROL SYSTEM FOR AN ELECTRIC VEHICLE

This is a continuation of application Ser. No. 08/292,193 filed on Aug. 18, 1994, now abandoned, which is a divisional of Ser. No. 07/866,339 filed Apr. 9, 1992, now U.S. Pat. No. 5,384,522.

BACKGROUND OF THE PRESENT INVENTION

The present invention relates to a regenerative braking control system for an electric vehicle driven by an electric power supply, namely a battery. More specifically, the present invention relates to a regenerative braking control system for electric vehicle which is capable of individually controlling the charging current for recharging the battery and the braking force applied by the brakes.

The present invention also relates to a controller for an electric vehicle driven by an electric motor. More specifically, the present invention relates to a controller for an electric vehicle which is capable of securing satisfactory controllability even if a portion of the electric system for controlling the driving of the drive motor malfunctions during a running operation.

Regenerative braking is used widely as an energy saving means for an electric vehicle employing a DC motor as its driving force. Regenerative braking is achieved by interrupting the power supply to the DC motor, converting the kinetic energy of the DC motor into electric energy, and utilizing this electric energy to recharge the power supply.

FIG. 5 is a block diagram illustrating a portion of the motor control system for an electric vehicle. FIG. 6 is a timing diagram which illustrates the procedure for controlling the regenerative braking process.

Referring to FIG. 5, driving coils U, V, and W are wound on a stator 37, and a rotor shaft 19 is mounted with a rotor 51 and a magnet rotor 48 for rotation within the central portion of the stator 37. Hall-effect devices UH, VH, and WH are arranged around the magnet rotor 48 for determining, in a non-contactual manner, the angular position of the rotor 51. Detection signals produced by the Hall-effect devices are fed to an angular position detecting device 46. The angular position detecting device 46 determines the angular position of the rotor 51 based on the detection signals and produces an angular position signal which is fed to a commutation/rectification control device 45.

The commutation/rectification control device 45 includes a running mode commutation control device 45a which operates during the normal running state, a regenerative mode rectification control device 45b which operates during a regenerative state, and a switching circuit 45c for selecting either the running mode commutation control device 45a or the regenerative mode rectification control device 45b.

The driving coils U, V, and W are connected to a commutating/rectifying device 90. This commutating/rectifying device 90 includes a switching unit 90a which includes transistors and diodes in combination and a pre-driving unit 90b. The switching unit 90a controls the power supplied from a battery BA to the driving coils U, V, and W. This switching unit 90a also acts as a path for feeding the recharging power from the driving coils to the battery BA.

During a normal running state, the switching circuit 45c selects the running mode commutation control device 45a so that the commutation/rectification control device 45 operates properly during the running mode.

The running mode commutation control device 45a switches the transistors of the switching unit 90a ON and OFF so that the power being supplied from the battery BA to the driving coils U, V, and W is carried out according to a predetermined timing scheme.

Consequently, a DC drive motor M is driven in a rotational manner by the power supply thereto from the battery BA such that the electric vehicle is driven.

On the other hand, in a regenerative braking mode, the duty factor of a pulse signal for controlling the power supplied to the drive motor M (driving duty factor) is reduced to zero. Upon the detection of the reduction of the driving duty factor to zero, a braking detecting device 79 produces a braking detection signal which is fed to the switching circuit 45c. The switching circuit 45c then selects the regenerative mode rectification control device 45b.

The regenerative mode rectification control device 45b switches the transistors ON and OFF so that regenerative power is produced by the drive motor M and consumed by the commutating/rectifying device 90 and the driving coils U, V, and W for braking.

In the regenerative braking mode, a three phase AC voltage as shown in FIG. 6(a) is produced by the driving coils U, V, and W. During this state of operation, the regenerative mode rectification control device 45b feeds a pulse signal to the transistors $UTr_1$, $VTr_1$, and $WTr_1$ so that these transistors are turned OFF. Moreover, the regenerative mode rectification control device 45b supplies a pulse signal, as shown in FIG. 6(b), to the transistors $UTr_2$, $VTr_2$, and $WTr_2$ so as to turn these transistors OFF and ON periodically and simultaneously.

When the transistors $UTr_2$, $VTr_2$, and $WTr_2$ are turned OFF, currents induced in the driving coils tend to remain, and hence, a high voltage remains across each coil which can be utilized in recharging the battery BA.

Since the magnitude of the regenerative braking force is proportional to the energy consumed by the transistors, diodes, and driving coils while the transistors $UTr_2$, $VTr_2$, and $WTr_2$ are switched ON, the magnitude of the regenerative braking force is proportional to the pulsewidth of the pulse signal. Accordingly, the pulsewidth is increased when a large braking force is desired, and the pulsewidth is decreased or diminished, as shown in FIG. 6(c), when a small braking force is desired.

The prior art device which utilizes this pulsewidth to control the braking force. However, such a method has encountered many problems in the actual regulation of the pulsewidth of the pulse signal. Since the induced current for recharging the battery BA is dependent upon the electromotive force of each coil when the transistors are turned OFF, the amount of charging energy is substantially constant regardless of the pulsewidth of the pulse signal. The only exception to this situation is when the pulsewidth is small and the electromotive force is in a transient state. Accordingly, the braking force and the recharging energy in the prior art devices could not be controlled individually.

Since the prior art devices were not able to control the braking force and the recharging energy individually, the prior art devices found it impossible to carry out a control operation, for example, which decreases the recharging energy when the battery is fully charged and increases the recharging energy when the battery is not fully charged notwithstanding the actual priority to be given to the controlling of the braking force.

More specifically, the prior art devices place the braking force as the highest priority and thus ignored the controlling of the recharging energy. Consequently, by ignoring the controlling of the recharging energy, either the battery became overcharged by regenerative braking when the battery was already basically overcharged or the battery could not be readily recharged to its full capacity if the battery was not already fully charged prior to the regenerative process.

Therefore, one embodiment of the present invention provides a regenerative braking control system for an electric vehicle which is capable of individually controlling the braking force and the recharging energy during a regenerative braking mode.

FIG. 34 is a block diagram illustrating a portion of an electric system for controlling the driving of the drive motor of an electric vehicle. Driving coils U, V, and W are wound on a stator 37 of a drive motor M. A rotor 51 and a magnet rotor 48 are supported for rotation in a central portion of the stator 47. Hall-effect position sensors UH, VH, and WH determine, in a non-contactual manner, the angular position of the rotor 51. These position sensors provide position detection signals to a controller 10.

A driver 90 includes a switching circuit 90a which includes transistors and diodes and a pre-driving unit 90b. The driver 90 controls power supplied from a battery BA to the driving coils U, V, and W. Moreover, the driver 90 controls the recharging of the battery BA by the energy generated in the driving coils.

A motor temperature sensor 21 detects the temperature of the drive motor M and produces a temperature signal TM representing the temperature of the drive motor and feeds this temperature signal to the controller 10. An accelerator position sensor 22 detects the position of the accelerator and produces an accelerator position signal TH which represents the actual position of the accelerator and feeds this signal to the controller 10. The controller 10 determines the rotor position based on the position signals received from the position sensors.

FIG. 35 illustrates a table showing the detection signals provided by the position sensors and the corresponding angular positions of the rotor. For example, when the Hall-effect position sensors UH, VH, and WH detect an N-pole, an S-pole, and an S-pole, respectively, the rotor is at an angular position as illustrated by number 1 in FIG. 35.

The controller 10 determines, on the basis of the accelerator position signal TH, whether the vehicle is in a driving mode (the vehicle is being driven by the drive motor) or whether the vehicle is in a braking mode (when the vehicle is being braked). If the vehicle is in the driving mode, the controller 10 produces output signals to be fed to the transistors of the switching unit 90a as illustrated in FIG. 36.

These output signals are produced according to the angular position of the rotor 51. Moreover, the controller 10 controls the duty factor of a motor driving signal supplied to the drive motor M (driving duty factor) according to the accelerator position signal TH. Consequently, the magnitude of the power corresponding to the accelerator position is supplied from the battery BA to the drive motor M when the electric vehicle is in the driving mode.

During the braking mode, an electric brake is applied. FIGS. 6(a)–6(c) illustrate timing charts of the control mode for electrical braking. When power supplied to the drive motor M is terminated, three phase voltage, as shown in FIG. 6(a) is generated in coils U, V, and W, respectively. During this electrical braking mode, the transistors $UTr_1$, $VTr_1$, and $WTr_1$ are turned OFF. Also, a pulse signal, as illustrated in FIG. 6(b), is applied to transistors $UTr_2$, $VTr_2$, and $WTr_2$ to turn OFF and ON these transistors periodically and simultaneously. Consequently, the electromotive force generated by the coils is consumed as heat by the coils, transistors, and the diodes when the transistors $UTr_2$, $VTr_2$, and $WTr_2$ are switched ON. This allows the drive motor M to be braked.

When these transistors are switched OFF, the currents induced in the coils tend to remain. This in turn maintains a high voltage across the terminals of each coil. If the voltage across the terminals of each coil is higher than the supply voltage of the battery BA, the induced currents flow toward the battery BA to recharge this battery.

Since the braking force is proportional to the energy consumed by the transistors and diodes while the transistors $UTr_2$, $VTr_2$, and $WTr_2$ are switched ON, the braking force is proportional to the duty factor of the pulse signal (braking duty factor). Accordingly, the braking duty factor is increased (the pulsewidth is increased) when a high braking force is necessary. Moreover, the braking duty factor is decreased (the pulsewidth is decreased) when a low braking force is necessary.

The prior art devices which utilize the system described above are also provided with a second controller for turning OFF all of the transistors of the driver 90 to stop the power from being supplied to the drive motor M, thereby preventing adverse effects upon the components of the electrical system when all of the position sensors produce the same position detection signals due to a malfunction or when the control of the power supplied to the drive motor becomes impossible. This hindrance of the controlling of the power supplied to the drive motor M may occur due to a malfunction of the accelerator position sensor or when the temperature of the drive motor increases excessively.

If all of the transistors of the driver 90 are turned OFF by the second controller when a portion of the electric system malfunctions, the driving wheels of the electric vehicle cannot be properly braked by using regenerative braking. Thus, the electric vehicle must be braked by using a mechanical braking system in order to stop the vehicle properly. In other words, the electric vehicle cannot decelerate in a satisfactory manner. Therefore, if all of the transistors of the driver 90 are turned OFF, the control of the electric vehicle according to the operations of the throttle, becomes impossible.

Accordingly, one embodiment of the present invention provides a controller for an electric vehicle which is capable of satisfactorily controlling the electric system of an electric vehicle even if a portion of the electric system for controlling the drive motor of the electric vehicle malfunctions.

OBJECTS AND SUMMARY OF THE PRESENT INVENTION

It is an object of the present invention to provide a regenerative braking control system for an electric vehicle which is capable of individually controlling the braking force and the recharging energy during regenerative braking.

It is another objective of the present invention to provide a controller for an electric vehicle which is capable of satisfactorily controlling the electric system of the electric system when a portion of the electric vehicle for controlling the drive motor malfunctions.

To achieve one of the objects discussed above, the present invention provides a regenerative braking control system for an electric vehicle which consumes a portion of energy generated by the drive motor for braking and feeds a portion of the energy to a battery for recharging. This regenerative braking control system includes a braking period device for establishing a braking period that is started and ended within a half of a period of an AC voltage created in the coils. The system also includes a regenerative device for feeding an induced current corresponding to the energy stored in the coils at the end of a braking period to a battery and an energy consuming circuit for consuming the energy generated during the braking period.

When the braking operation is controlled by the regenerative braking control system described above, the braking force is proportional to the integral of the AC power consumed during the braking period. Moreover, the energy used to recharge the battery is dependent upon the electromotive force at the end of the braking period. Accordingly, the braking force and the recharging energy can be individually controlled by properly determining the starting time and ending time of the braking period.

Another embodiment of the present invention which achieves the object discussed above is a regenerative braking control system which includes a first braking period device for establishing a first braking period that is started within a half of a period of the AC voltage created in the coils, a second braking period device for establishing a second braking period that is ended within a half of a period of the AC voltage, a regenerative device for feeding the induced current corresponding to the energy stored in the coils at the end of the first braking period to the power supply, and an energy consuming circuit for consuming energy remaining at the end of the first braking period and the energy generated during the second braking period.

When the braking operation is controlled by the regenerative braking control system described above, the braking force is proportional to the integral of the AC power consumed during the first and second braking periods. The energy used to recharge the battery is dependent upon the electromotive force at the end of the first braking period. Accordingly, the braking force and the charging energy can be controlled individually by controlling the first and second braking periods.

A further embodiment of the present invention which controls regenerative braking includes a chopping device for chopping the braking period so that the braking period consists of a plurality of intermittent short braking periods. When utilizing the chopping device in the regenerative braking operation, the recharging energy can be increased because a current is being induced at the end of every intermittent short braking period.

In still another embodiment of the present invention which realizes the objects discussed above is a controller which includes a monitor for monitoring the electric system to determine whether the electric system is functioning normally and an electrical braking device for electrically braking the drive motor when the monitor determines that the electric system or a portion of the electric system is malfunctioning.

When a controller is utilized as described above, the controller actuates the electric braking device upon the detection of the malfunction in the electric system. Accordingly, the vehicle can be decelerated in a satisfactory manner even if a portion of the electric system malfunctions while the vehicle is running.

Another embodiment of the present invention is a controller which includes a monitor for monitoring if the electric system is functioning normally and a correcting circuit for gradually decreasing the voltage used to control speed when a malfunction is detected by the monitor. This decreased voltage is applied to the drive motor when a malfunction is detected to control the motor's speed.

When utilizing this controller as described above, the malfunction of a portion of the electric system is detected by the monitor. Upon detecting this malfunction, the controller applies a voltage which is gradually decreasing. Accordingly, the power being supplied to the drive motor can be decreased without significantly deteriorating the controllability of the vehicle after a malfunction is detected in a portion of the electric system.

BRIEF DESCRIPTION OF THE DRAWINGS

Other objects and advantages of the present invention will become more apparent to those skilled in the art from the detailed description of the preferred embodiments with reference to the accompanied drawings wherein:

FIG. 32 illustrates a throttle opening sensor;

FIGS. 33(a)–33(c) are charts illustrating other embodiments of the present invention;

FIG. 35 is a table showing a relationship between signals provided by angular position sensors and an angular position of a rotor;

FIG. 36 is a table illustrating the control of the drive motor according to an angular position of a rotor;

DETAILED DESCRIPTION OF THE PRESENT INVENTION

Figure 1:
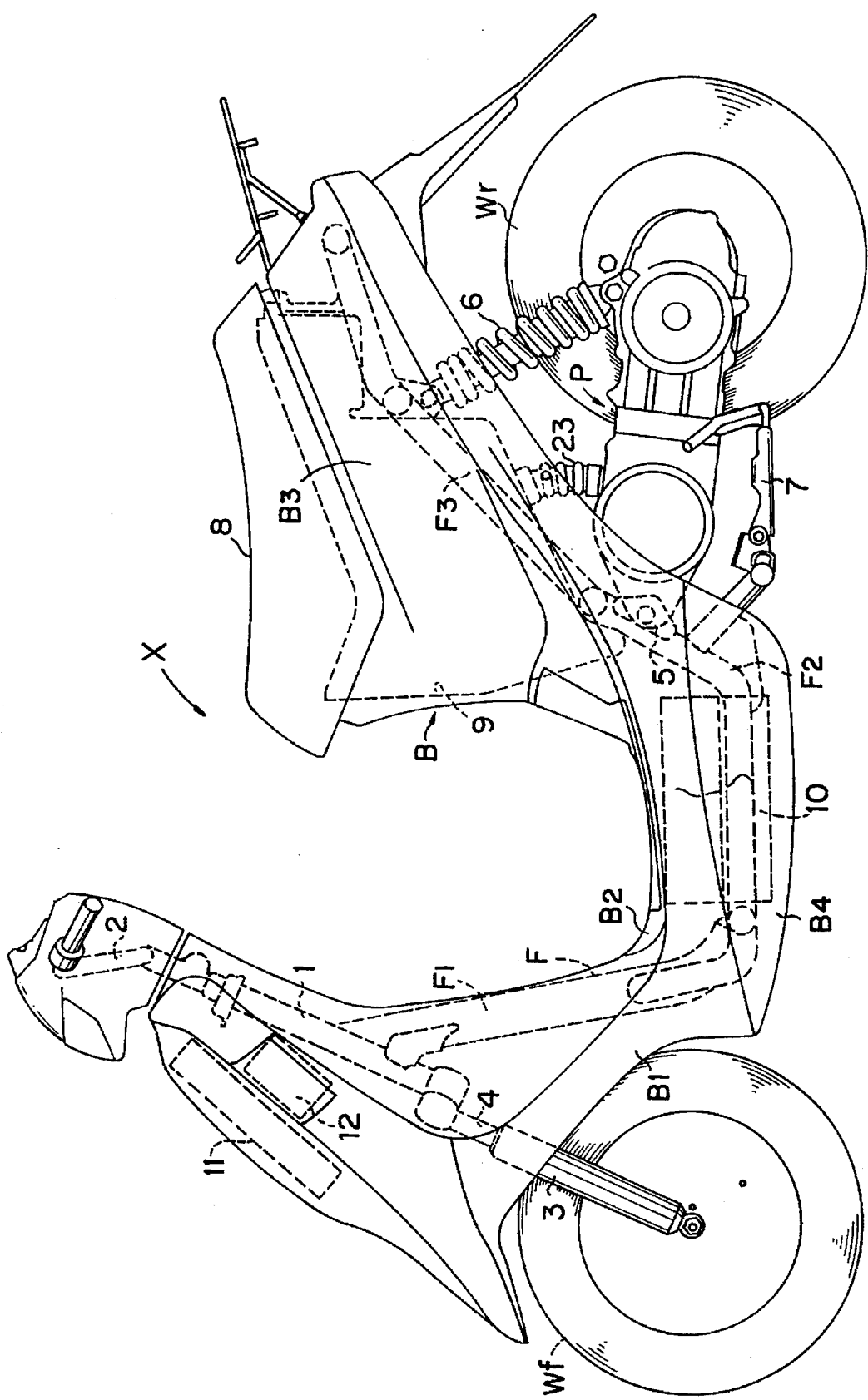
FIG. 1 is a general view of an electric motorcycle incorporating the present invention.

FIG. 1 is an illustration generally showing an electric motorcycle incorporating the present invention. The electric motorcycle X has a mainframe F consisting of a front frame F1, a middle frame F2, and a rear frame F3. Each frame is formed of steel pipes. Main frame F is covered with a leg shelf B1, a step floor B2, a rear cover B3, and an undercover B4.

A steering device 2 is attached to the upper end of a head pipe 1 and fixed to the front frame F1. A front fork 4 for suspending a front wheel WF by a front shock absorber 3 is joined for turning the lower end of the head pipe 1. A swing power unit P has a front end pivotally joined to the rear end of the metal frame F2 by a pivot 5. A rear end of the swing power unit P supports a rear wheel WR by a rear axle. The power unit P swings vertically on the pivot 5. A rear shock absorber 6 has a lower end joined to the upper surface of the rear portion of the power unit P and an upper end joined to the rear frame F3.

A stand 7 is connected to the middle frame F2 so as to cover the front lower surface of the power unit to serve as a protective member which protects the drive unit of the power unit P. A storage box 9 for containing a helmet and other items is provided between the power unit P and a seat 8. The storage box 9 is formed of a material capable of magnetic shielding, such as a conductive resin, to protect the contents from the magnetism of the drive motor M.

A battery box 10 contains a battery for supplying power to the drive motor and is supported on the middle frame F2. A controller 11 for controlling the drive motor M and a recharger 12 for recharging the battery are provided in front of the head pipe 1.

The power unit P has a front transmission case 13. The pivot 5 extends laterally through the transmission case 13. The drive motor M is placed in front of the transmission case 13. A reduction gear 14 is placed in the rear portion of the transmission case 13. The drive motor M and the reduction gear 14 are interlocked by a belt-type continuously variable speed transmission 15. The transmission case 13 is divided into a left hand transmission chamber 13b for containing the belt-type continuously variable speed transmission 15 and a right hand motor chamber 13c for containing the drive motor M. The transmission case is divided by a partition wall 13a.

A motor housing 16 housing the drive motor M is placed in the motor chamber 13c. A driver housing 13d forms a portion of the transmission case 13 and contains a driver 25. This driver housing 13d is joined to the right end surface of the motor housing 16 and is fastened to the motor housing by bolts 8. The rotor shaft 19 of the drive motor M is supported by a ball bearing 20 provided in the motor housing 16 and is further supported by a ball bearing 21 provided on the inner wall of the transmission case 13.

A cooling fan 22 is mounted on the right hand of the rotor shaft 19 within the motor housing 16. A flexible duct 23 for introducing cooling air into the motor chamber 13c has a lower end joined to the upper wall of the transmission case 13 at the position between the drive motor M and the belt-type continuously variable speed transmission 15. Also, the flexible duct 23 has an upper end opening into the storage box 9.

Figure 2:
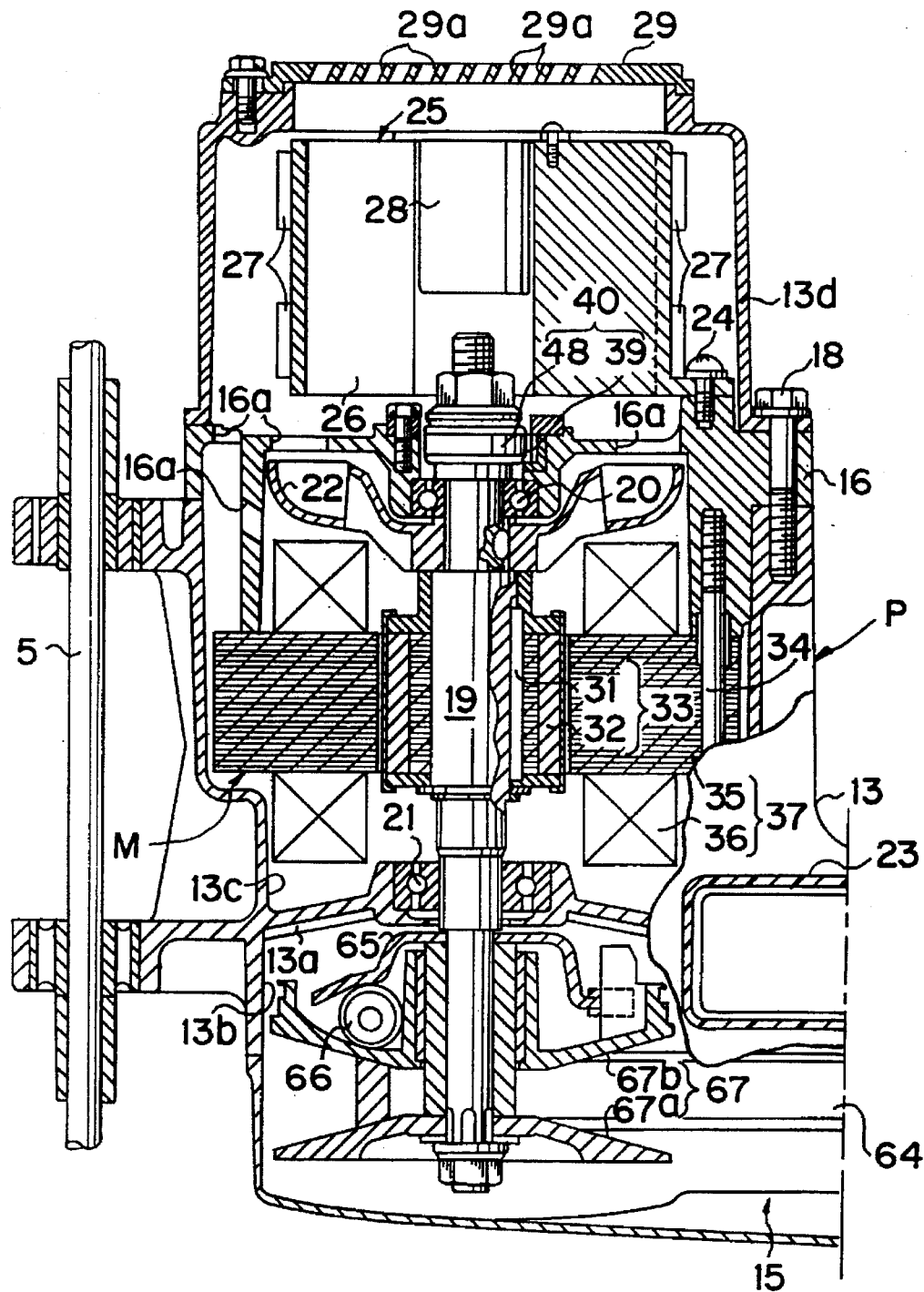
FIG. 2 is a sectional view of a power unit utilized by the present invention.
Figure 3:
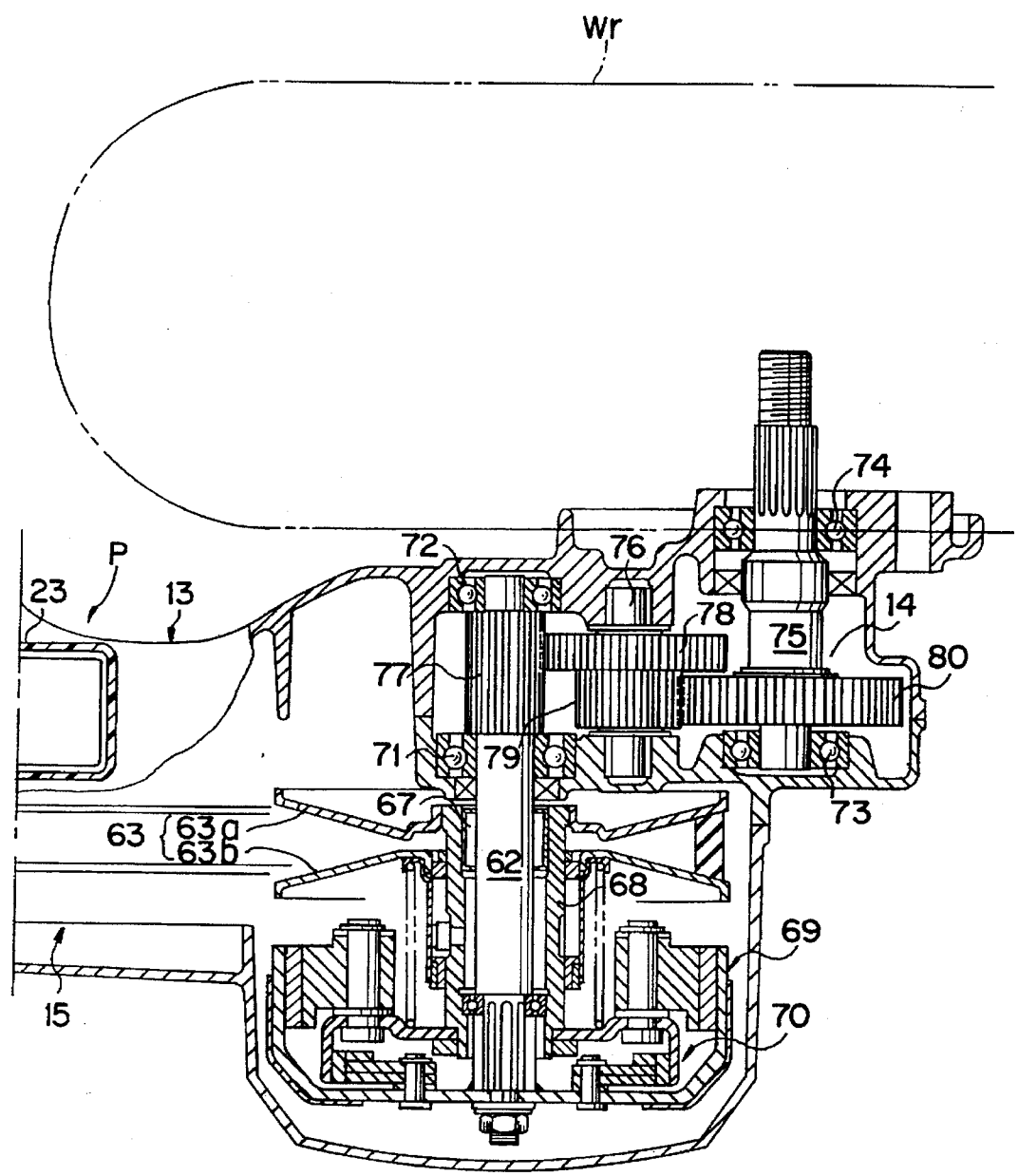
FIG. 3 is another sectional view of a power unit utilized by the present invention.
Figure 4:
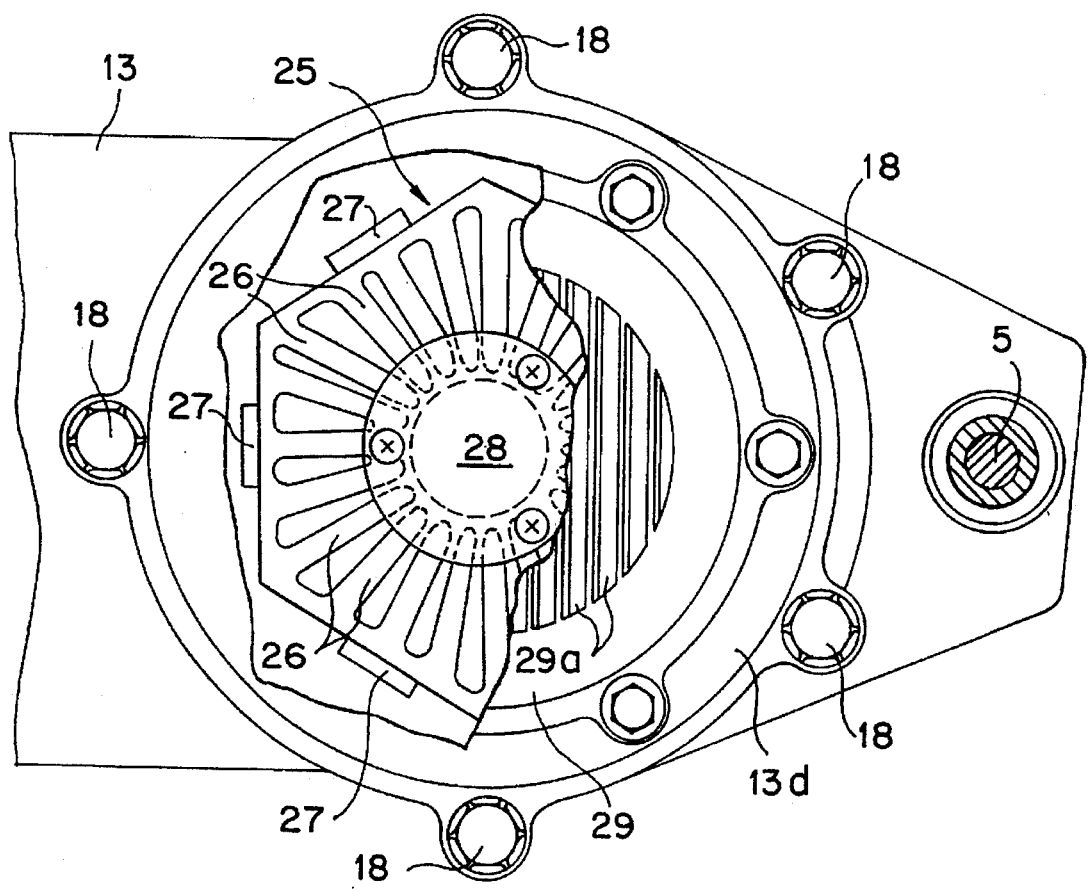
FIG. 4 is a third sectional view of a power unit utilized by the present invention.

Referring to FIGS. 2, 3, and 4, the driver 25 having a substantially hexagonal shape is disposed coaxially with the rotor shaft 19 and the driver housing 13(d). The driver 25 is also fastened to the motor housing 16 with bolts 24. A plurality of cooling fans 26 project from the inner surfaces of the sides of the driver 25.

Field Effect Transistors (FETS) are attached to the outer surface of the driver 25. A capacitor 28 having a large capacitance is firmly fitted in the central space of the driver. The right hand open end at the motor housing 16 is covered with a cover provided with a discharge opening 29a which includes louvers.

Drive motor M is a DC brushless motor having a rotor 33 formed by arranging permanent magnets 32 on an outer circumference of a core 31 fixedly mounted on the rotor shaft 19. Stator 37 is formed by winding coil 36 on a core 35 disposed within and fastened to the motor housing 16 with bolts 34. The angular position sensor 40 detects the angular position of the rotor 33. A magnet rotor 48 is fixedly mounted on the rotor shaft 19. Three Hall-effect devices 39(UH, VH, and WH) are disposed opposite to the outer circumference of a magnet rotor 48.

Cooling air is introduced through the storage box 9 and the duct 23 into the motor chamber 13c by the cooling fan 22. This cooling air cools the drive motor M and flows through hole 16a formed in the motor housing 16 and into the driver housing 13d. Moreover, the cooling air cools the FETS 27 and the capacitor 28 before flowing outside through the discharge opening 29a of the cover 29.

Referring to FIGS. 2 and 3, the belt-type continuously variable speed transmission 15 has a driving pulley 61 mounted on a portion of the rotor shaft 15 projecting into the transmission case 13. A driven pulley 63 is mounted on the input shaft 62 of the reduction gear 14 supported on the rear portion of the transmission case 13. An endless belt 64 is extended between the pulleys 61 and 63.

The driving pulley 61 consists of a fixed pulley element 61a connected to the rotor shaft 19 and a moveable pulley element 61b actually slidable mounted on the rotor shaft 19. Centrifugal weights 66 are provided to move radially between the moveable pulley element 61b and a ramp plate 65 fixed to the rotor shaft 15.

The driven pulley 63 consists of a fixed pulley element 63a placed on a collar 68. A needle bearing 67 on the input shaft 62 of the reduction gear 14 is supported for rotation relative to the input shaft 62 of the reduction gear 14. A moveable pulley element 63b is mounted on the collar 68 for axial movement thereon. A driving force is transmitted from the rotor shaft 19 to the driven pulley 63 through an automatic centrifugal clutch 69 and the input shaft 62. The driving force from the input shaft 62 of the reduction gear 14 is transmitted through another automatic centrifugal clutch 70 to the driven pulley 63.

The input shaft 62 of the reduction gear 14 is supported by a pair of ball bearings 71 and 72 provided on the transmission case 13. Intermediate shaft 76 is supported on the transmission case 13 between the input shaft 62 and a rear axle 75 supported by a pair of ball bearings 73 and 74. Moreover, these ball bearings 73 and 74 support the rear wheel WR. The rotation of a driving gear 77 mounted on the input shaft 62 is transmitted by two intermediate gears 78 and 79 mounted on the intermediate shaft 76 to a driven gear 80 fixed to the rear axle 75.

When the motor speed of the drive motor M is low, the automatic centrifugal clutch 69 remains disengaged, and hence, the driving force of the drive motor is not transmitted to the rear wheel WR. As the motor speed of the drive motor increases, the centrifugal weights move radially outward along the ramp plate 65 fixed to the rotor shaft 19 to shift the moveable pulley element 61b of the driving pulley 61 toward the fixed pulley element 61a. Consequently, the effective radius of the driving pulley 61 increases while the moveable pulley element 63b of the driven pulley 63 is shifted away from the fixed pulley element 63a by the endless belt 64, there by decreasing the effective radius of the driven pulley 63. Thus, the operative ratio of the belt-type continuously variable speed transmission 15 is decreased to increase the rotating speed of the collar 68 which rotates together with the driven pulley 63. Subsequently, the automatic centrifugal clutch 69 is engaged to transmit the driving force of the drive motor M to the input shaft 62 of the reduction gear 14, and consequently, the rear wheel WR is driven.

Clean air prevailing in the storage box 9 is introduced through the duct 23 into the motor chamber 13c of the transmission case 13 by the cooling fan 22 which rotates together with the rotor motor shaft 19 of the drive motor M. The cooling air removes heat generated by the coils 36 of the drive motor M. This cooling air flows through the hole 16a formed in the motor housing 16 and into the driver housing 13d. Moreover, the cooling air flows along the outer circumference of the driver 25 and through spaces between the cooling fans 26 to cool the FETS 27 and the capacitor 28. Lastly, the cooling air flows outside through the discharge opening 29a of the cover 29.

Since the duct 23 which guides the cooling air into the transmission case 13 is joined to the upper wall of the transmission case 13 at the position between the drive motor M and the belt-type continuously variable speed transmission 13, the duct does not protrude laterally from the transmission case 13 to increase the overall width of the transmission case. The dead space between the drive motor M and the belt-type continuously variable speed transmission 15 can effectively be utilized.

A control system for controlling the running of the electric motorcycle driven by the energy stored in the battery BA will be described below. In the following description, the duty factor of the pulse signal for controlling the power supplied to the drive motor M will be referred to simply as duty factor.

Figures 22, 23:
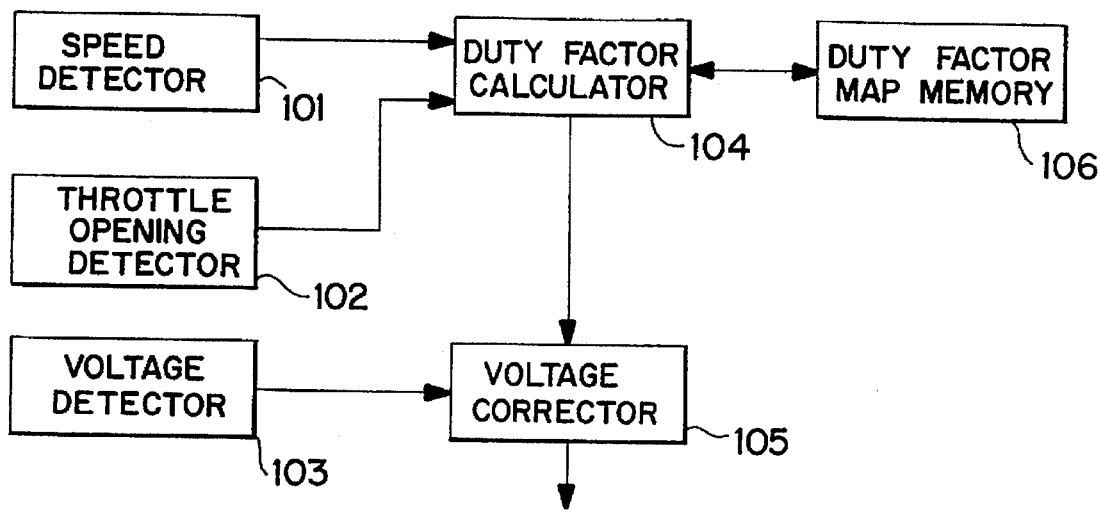
FIG. 22 is a block diagram of a motor control system according to the present invention.
FIG. 23 illustrates an example of a duty factor map.

FIG. 22 is a functional block diagram of a motor driving system which illustrates only the functions necessary for driving the drive motor M by the power supplied from the battery. Referring to FIG. 22, a speed detecting device 101 detects the motor speed Ne, i.e., the rotating speed of the rotor shaft 19 of the drive motor M. An accelerator position detecting device 102 detects an accelerator position $\theta_{th}$. A battery voltage detecting device 103 detects the battery voltage. A duty factor map storage device 106 stores data D(x,y) which represents the duty factors as a function of motor speed Ne and an accelerator position $\theta_{th}$, as shown in FIG. 23.

A duty factor calculating circuit 104 chooses duty factor data D(x,y) which corresponds to the detected motor speed Ne and the detected accelerator position $\theta_{th}$ from the duty factor map storage device 106. If any duty factor data D(x,y) which correspond to the detected motor speed Ne and the detected throttle opening TH is not found in the duty factor map storage device, optimal duty factor data D(x,y) is calculated by interpolation.

A voltage correcting device 105 corrects a duty factor so that a desired motor output is obtained regardless of the battery voltage. The output of the drive motor is controlled by varying the duty factor of the pulse signal, the output of the drive motor decreases when the battery voltage drops below a standard voltage even if the duty factor is held constant. Accordingly, the present invention regulates the duty factor so that the duty factor is increased when the battery voltage is low and the duty factor decreases when the battery voltage is high so as to maintain the desired output of the drive motor regardless of the battery voltage.

In other words, the present invention corrects the duty factor by multiplying the calculated duty factor by a reference voltage and dividing the product of this multiplication by the battery voltage. This calculation gives the present invention the corrected duty factor. By utilizing the corrected duty factor, the desired output of the motor factor can be obtained regardless of the variation in the battery voltage.

Since the present invention determines the duty factor as a function of the motor speed Ne and the accelerator position $\theta_{th}$, the following various control operations are able to be accomplished.

Figure 24:
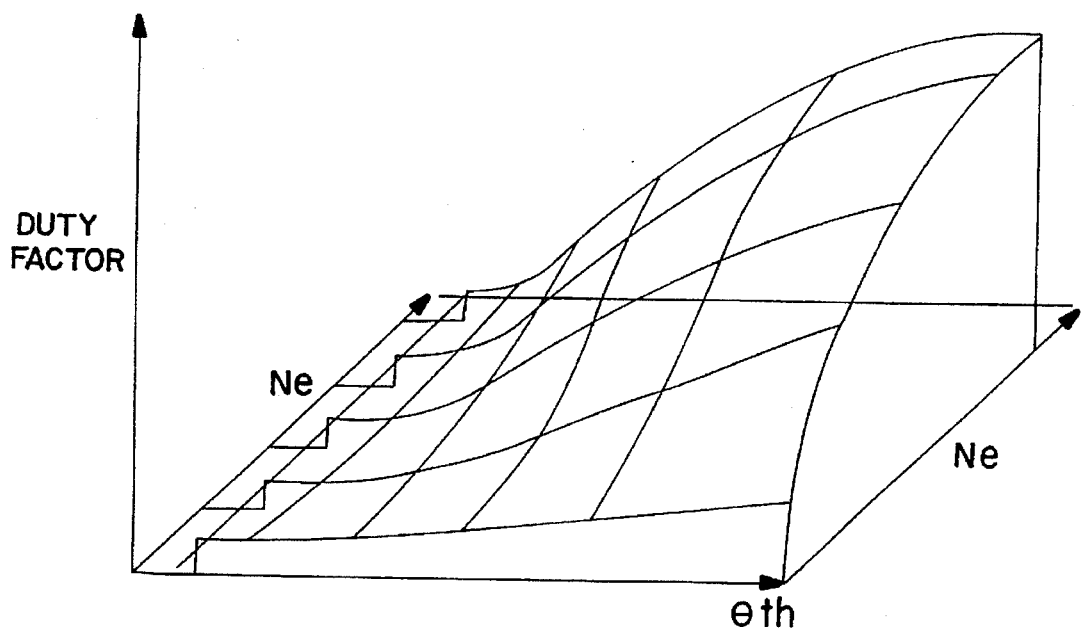
FIG. 24 is a diagram illustrating a method for producing a duty factor map.

FIG. 24 shows an example of the duty factor data map stored in the duty factor map storage device 106.

The present invention chooses a small duty factor regardless of the throttle opening $\theta_{th}$ at the starting of the drive motor or while the motor speed is low. Although, normally, a high current corresponding to a locking current tends to flow through the drive motor due to the inertial mass of the rotor when starting the drive motor, the present invention chooses a small duty factor during the starting of the drive motor and during low speed operations to inhibit a high current from flowing through the drive motor. Selection of the duty factor for maintaining the efficiency of the drive motor on a sufficiently high level will be described below.

Figure 25A:
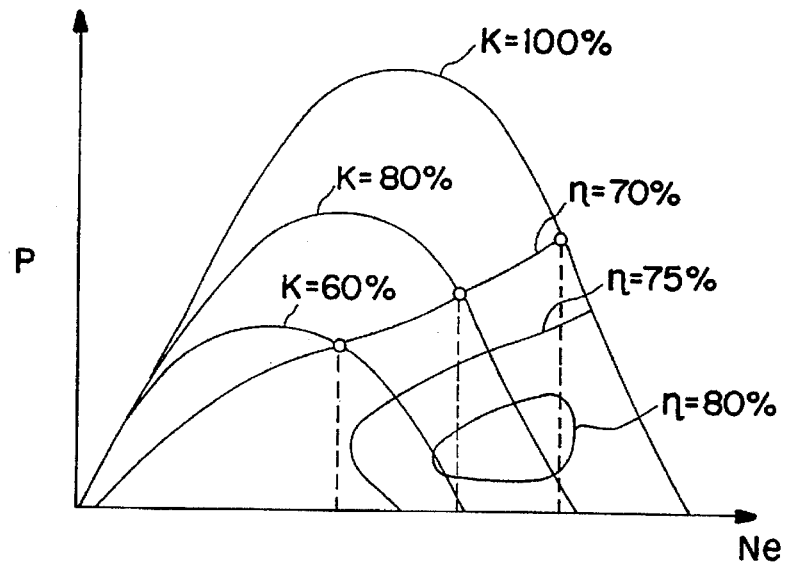
FIG. 25(a) and 25(b) are diagrams illustrating another method for producing a duty factor map.

FIG. 25(a) illustrates the general relationship between the motor speed Ne, motor output P, and efficiency η. Since the electric vehicle requires a large torque when starting the electric vehicle, a characteristic of the motor output P, as shown in FIG. 25(a), has been used. In other words, the higher the torque is and the lower the motor speed Ne is, a sufficiently high acceleration can be realized by utilizing this characteristic. However, if this characteristic is utilized during the starting of the electric vehicle, the efficiency η of the drive motor is greatly deteriorated.

Figure 25B:
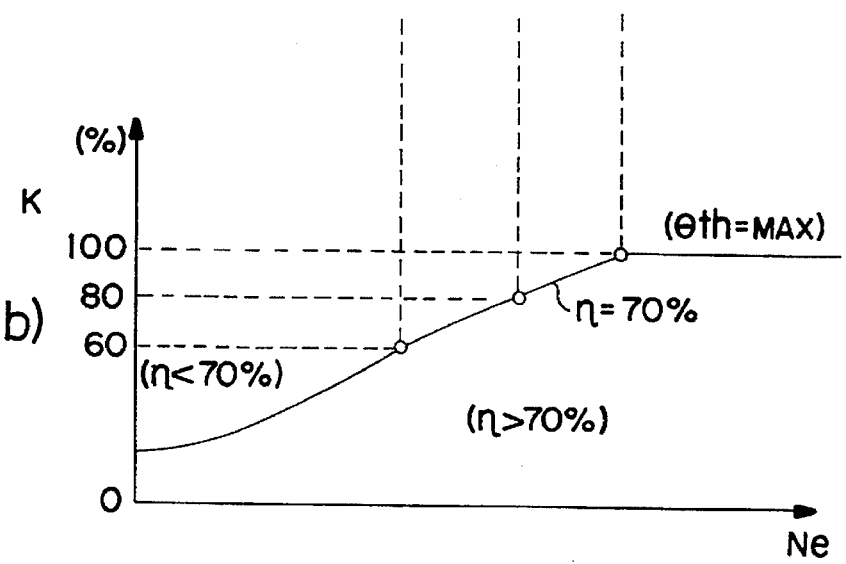

The present invention determines the relationship between the motor speed Ne (when the motor efficiency η is 70%) and the accelerator position $\theta_{th}$ is at a maximum and the duty factor as shown in FIG. 25(b). This relationship is stored in the duty factor map storage device 106 wherein the present invention chooses a duty factor corresponding to the motor speed Me so that the drive motor operates at an efficiency not lower than 70%.

A duty factor corresponding to an accelerator position smaller than the maximum accelerator position is smaller than a duty factor corresponding to the maximum accelerator position. Since the duty factor is regulated so that the area under a curve representing the conditions for maintaining a 70% efficiency is satisfied, the efficiency is not lower than 70% for any accelerator position lower than the maximum acceleration position if the relationship for the maximum accelerator position is determined.

Figure 26:
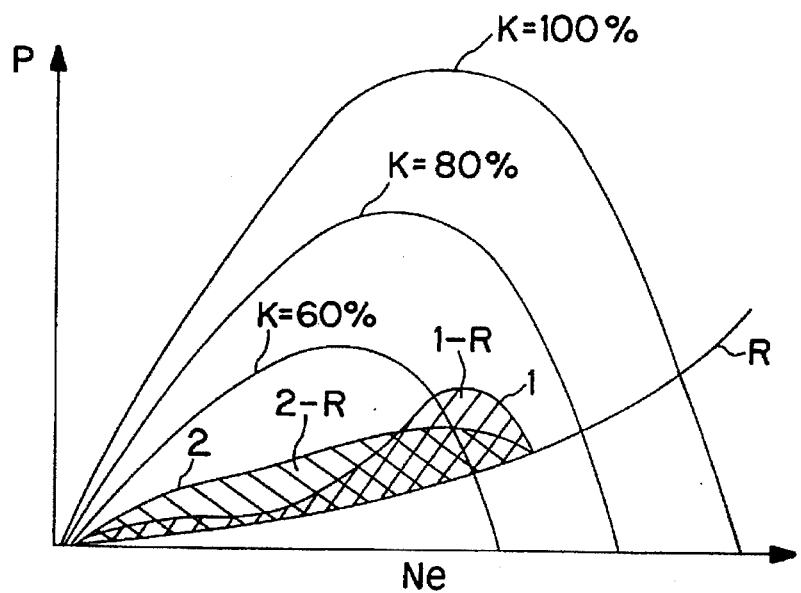
FIG. 26 is a diagram illustrating a third method for producing a duty factor map.

A method for setting the duty factor to control the running speed during acceleration will be described below. FIG. 26 shows the variation of the motor output P with the motor speed Ne for the duty factor K and running resistance R at a medium accelerator position.

A duty factor for operation with a medium accelerator position can be freely chosen, relatively, for operation at an efficiency exceeding 70% by using a duty factor map. However, if the relationship between the motor output P and the motor speed Ne is represented by a curve 1, the electric vehicle may be accelerated smoothly because acceleration, the difference between curve 1 and the running resistance R, is small in the initial stage of acceleration.

However, it is not preferable to control the running speed because acceleration increases gradually after the initial stage of acceleration. The present invention employs a duty factor map so that the relationship between the motor output P and the motor speed Ne at a medium throttle opening is similar to curve 2. This enables the acceleration (curve 2 - running resistance) to be high in the initial stage of acceleration and enables the acceleration to decrease with an increase in running speed.

A method for setting the duty factor to alleviate the problems of running speed at the start of the electric vehicle due to a difference between the throttle opening $\theta_{th}$ and the start of the electric vehicle will be described below.

Figure 27:
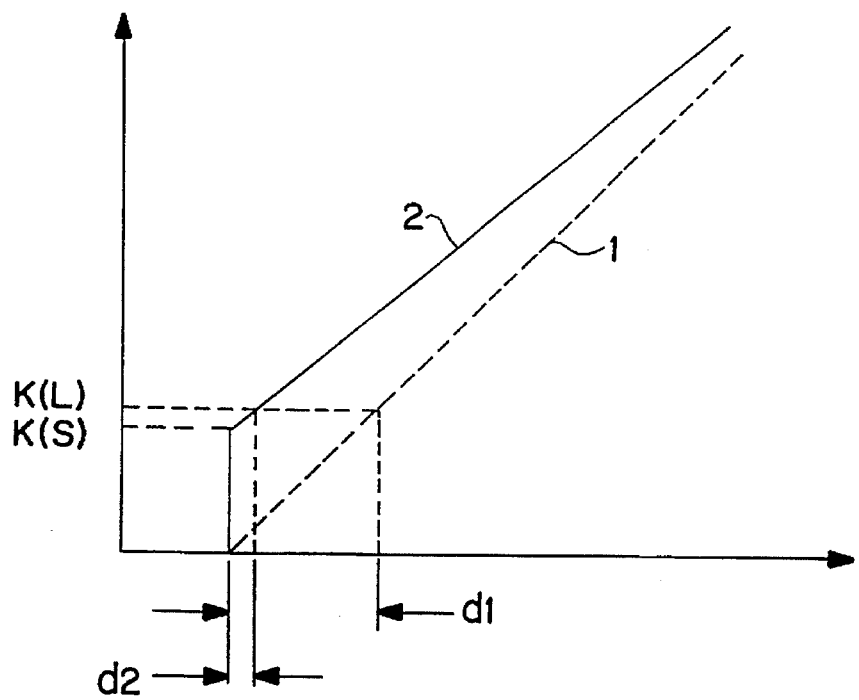
FIG. 27 is a diagram illustrating a fourth method for producing a duty factor map.

When the relationship between an accelerator position $\theta_{th}$ and the duty factor K is as represented by a dotted line 1 in FIG. 27, the electric vehicle employing a centrifugal clutch does not start running even if the accelerator position $\theta_{th}$ is increased gradually such that the duty factor K reaches a lower limit K(L) corresponding to a motor speed necessary for engaging the centrifugal clutch so that power can be transmitted. Accordingly, the range d1 during idle operations of the drive motor, a time interval from the position of the accelerator to start the drive motor, and the increase of the duty factor K to the lower limit K(L) is unsatisfactory. When a conventional vehicle is not running, the engine is kept operating for idling purposes.

Therefore, the increment of the accelerator position necessary for increasing the engine speed to a value sufficient for the clutch to transmit power is not very large. Hence, the disparity between the operation of acceleration and the response of the vehicle is not very significant. If the drive motor is kept running for idling even while the accelerator is fully closed, the unsatisfactory performance when starting an electric vehicle may be eliminated.

However, the operation of the drive motor for idling increases power consumption and thus reduces the distance that the vehicle can travel without recharging the battery. Accordingly, the present invention controls a duty factor K so that the duty factor K increases instantaneously to a threshold K(S) slightly smaller than the lower limit K(L) upon the increase of the accelerator position $\theta_{th}$ corresponding to a starting motor speed as indicated by continuous line 2 in FIG. 27. Thus, the range d2 for idling operations of the drive motor, a time interval from the start of the drive motor to the start of the electric vehicle, is curtailed to eliminate any unsatisfactory operations.

Figure 7:
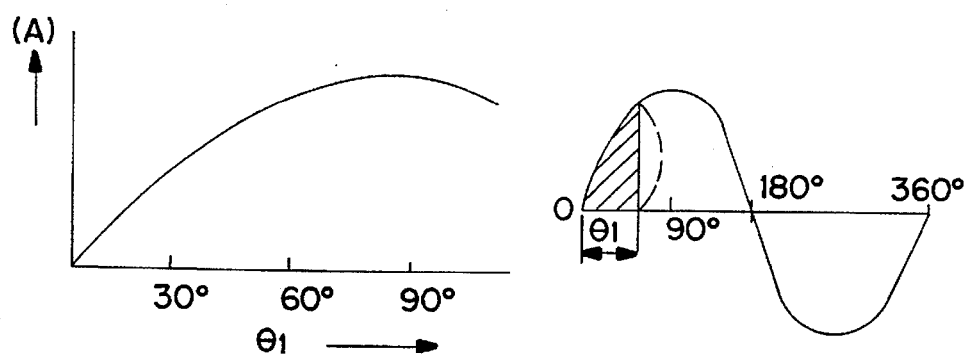
FIG. 7 is a graphical representation of the concepts of the present invention.
Figure 8:
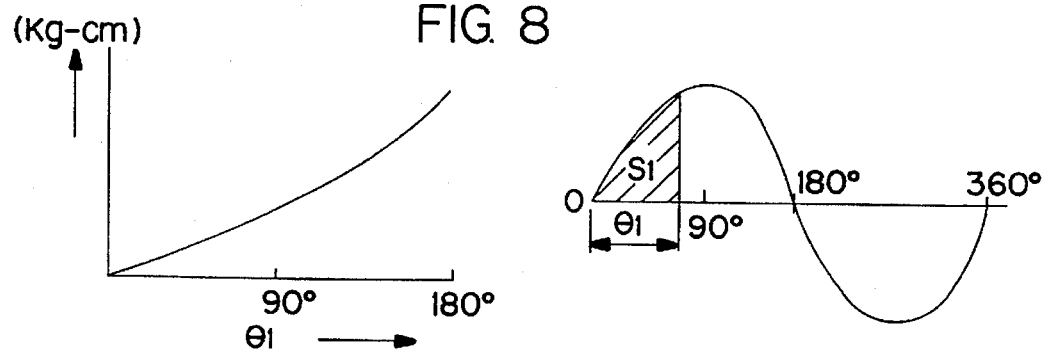
FIG. 8 is another graphical representation of the concepts of the present invention.
Figure 9:
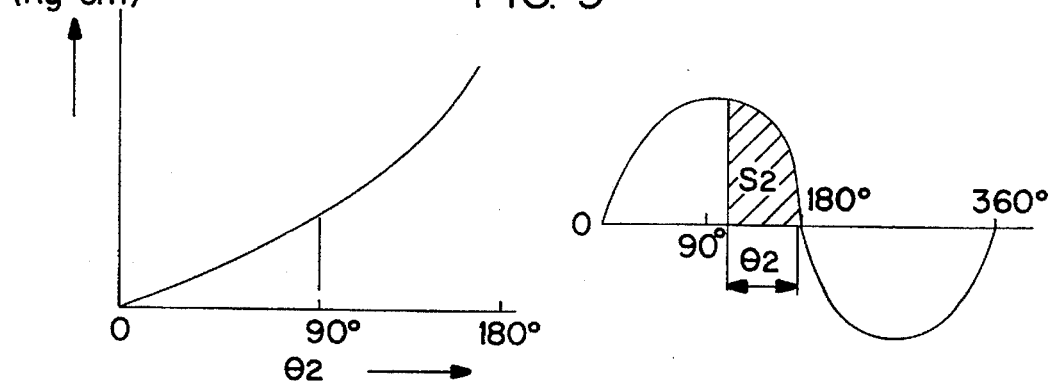
FIG. 9 is a third graphical representation of the concepts of the present invention.
Figure 10A:
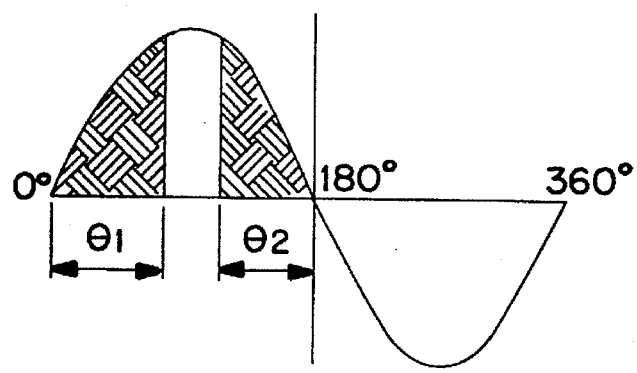
FIGS. 10(a)–10(d) are diagrams illustrating control modes according to the present invention.
Figure 10B:
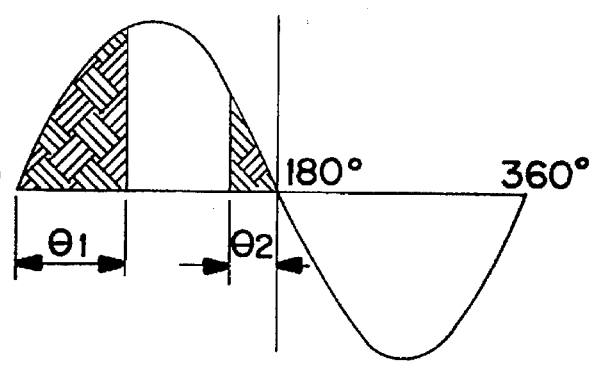
Figure 10C:
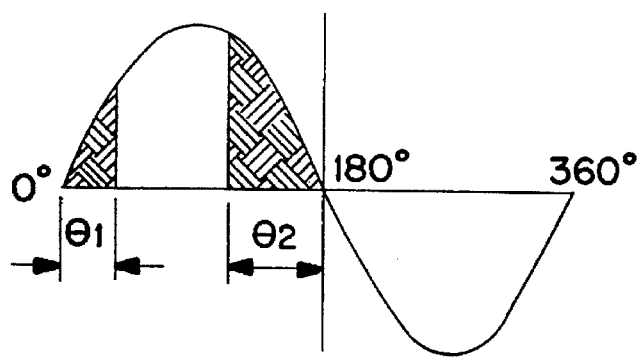
Figure 10D:
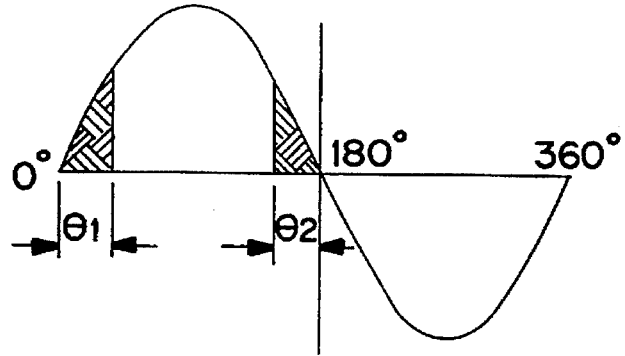

FIGS. 7, 8, and 9 are graphs illustrating the basic concepts of the present invention. In the following description, one period of an AC electromotive force produced in coil U corresponds to an electrical angle range of 0° to 360° and a mechanical angle range of 0° to 180°, an ON period of the transistors to be started at an electrical angle 0° within the electrical angle range of 0° to 90° is represented by angle $\theta_1$, and an ON period of the transistors to be ended within an electrical angle 180° of the electrical angle range of 90° to 180° is represented by an angle $\theta_2$. A recharging current I is supplied to the battery BA wherein this recharging current was induced in the coils when the transistors are turned OFF. Therefore, the magnitude of the recharging current I is proportional to the electromotive force of the coil immediately before the transistors are switched OFF. Accordingly, it is desirable that the angle $\theta_1$ be nearly equal to 90° as shown in FIG. 7 when it is desirable to have the recharging current I at its maximum.

The regenerative torque, the braking force, is proportional to the amount of energy consumed by the transistors, diodes, and coils when the transistors are in the ON state. This amount of energy is equal to the integral $S_1$ of the electromotive force induced in the coils when the transistors are in the ON state. Accordingly, it is desirable to increase the angle $\theta_1$, as shown in FIG. 7, when it is desired to have maximum braking force.

If only angle $\theta_1$ is used in controlling the operations of the electric vehicle, it is impossible to control the operations for decreasing recharging current and at the same time increasing braking force or vice versa. Accordingly, the present invention employs a second angle $\theta_2$ for individually controlling the recharging current and the braking force.

If the transistors are switched OFF always at an electrical angle of 180° within an electrical angle range of 90° to 180°, the induced current is zero, and hence, the recharging current is always zero. However, the braking force is dependent upon the integral $S_2$ of the electromotive force as illustrated in FIG. 9. The present invention controls the angles of $\theta_1$ and $\theta_2$ individually for each coil to control the recharging current and the braking force individually.

FIGS. 10(a)–10(d) illustrate the control diagrams for individually controlling the recharging current and the braking force by individually controlling the angles $\theta_1$ and $\theta_2$ for each coil. In other words, when both angles $\theta_1$ and $\theta_2$ are increased, both the recharging current and the braking force are increased. Moreover, when angle $\theta_1$ is increased and angle $\theta_2$ is decreased, the recharging current is increased and the braking force is decreased. When the angle $\theta_1$ is decreased and the angle $\theta_2$ is increased, the recharging current is decreased and the braking force in increased. Lastly, when both angles $\theta_1$ and $\theta_2$ are decreased, both the recharging current and the braking force are decreased.

Figure 5:
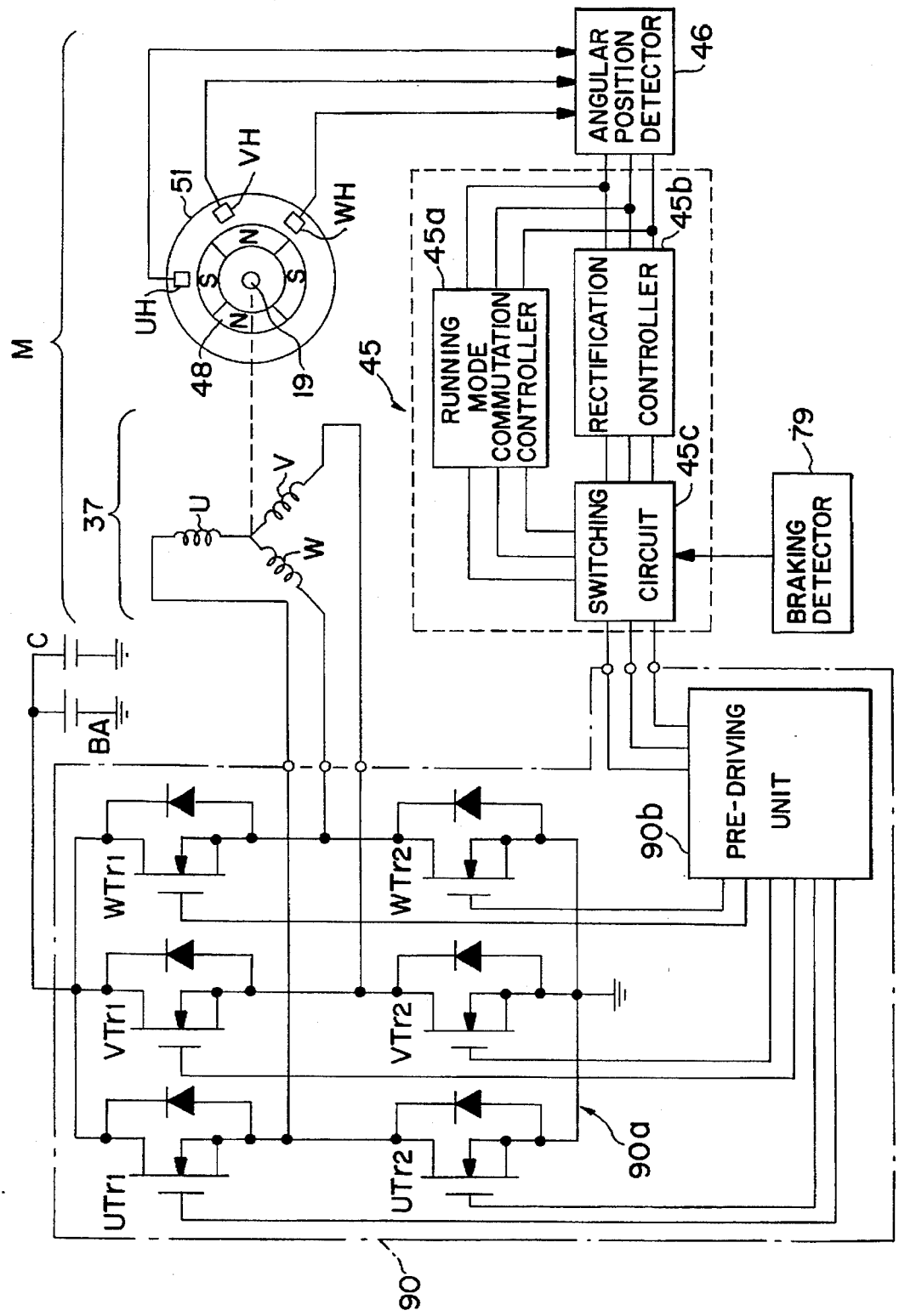
FIG. 5 is a block diagram illustrating a motor control system for an electric vehicle.
Figure 6:
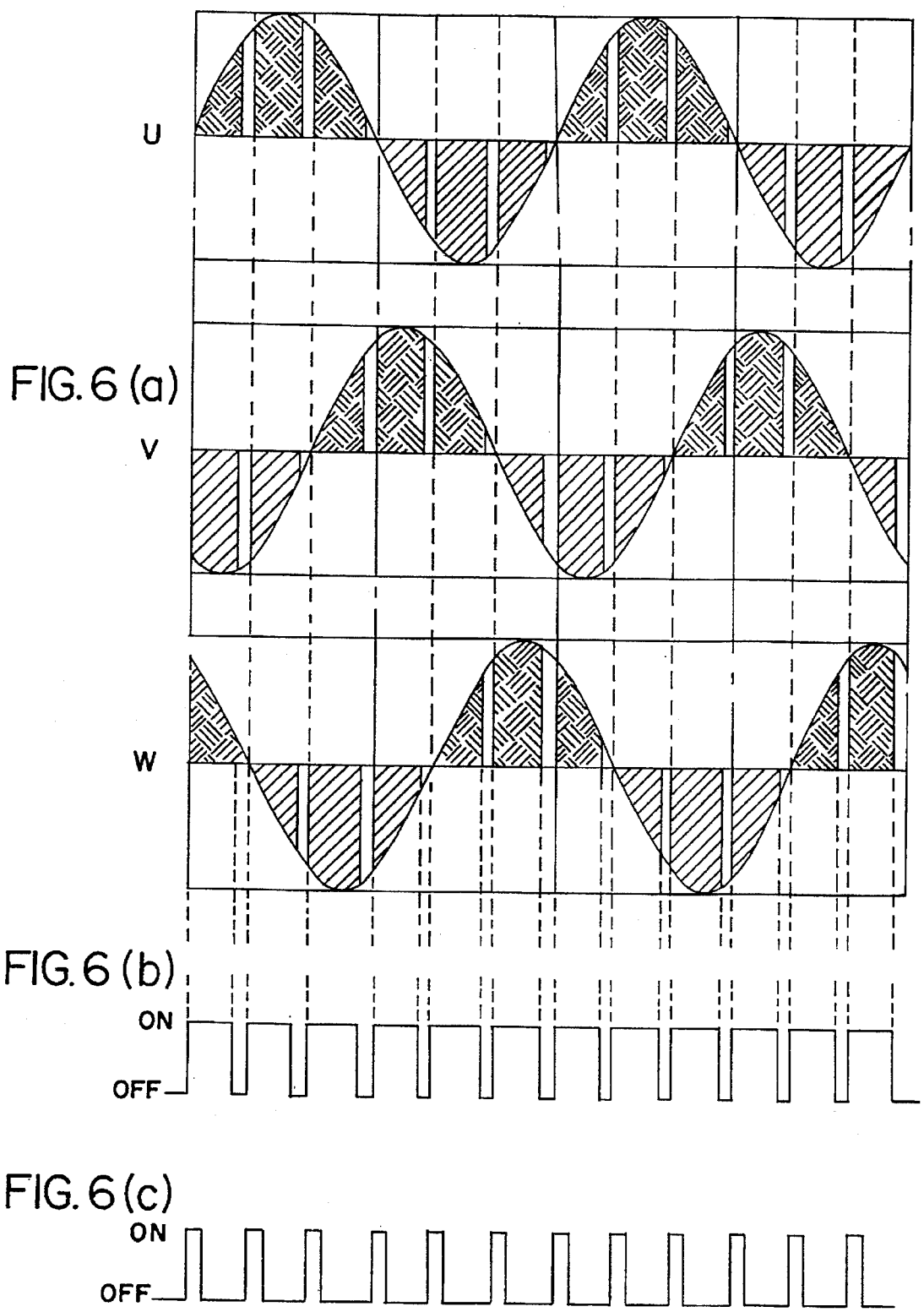
FIG. 6 is a timing diagram illustrating a conventional control method for regenerative braking.
Figure 11:
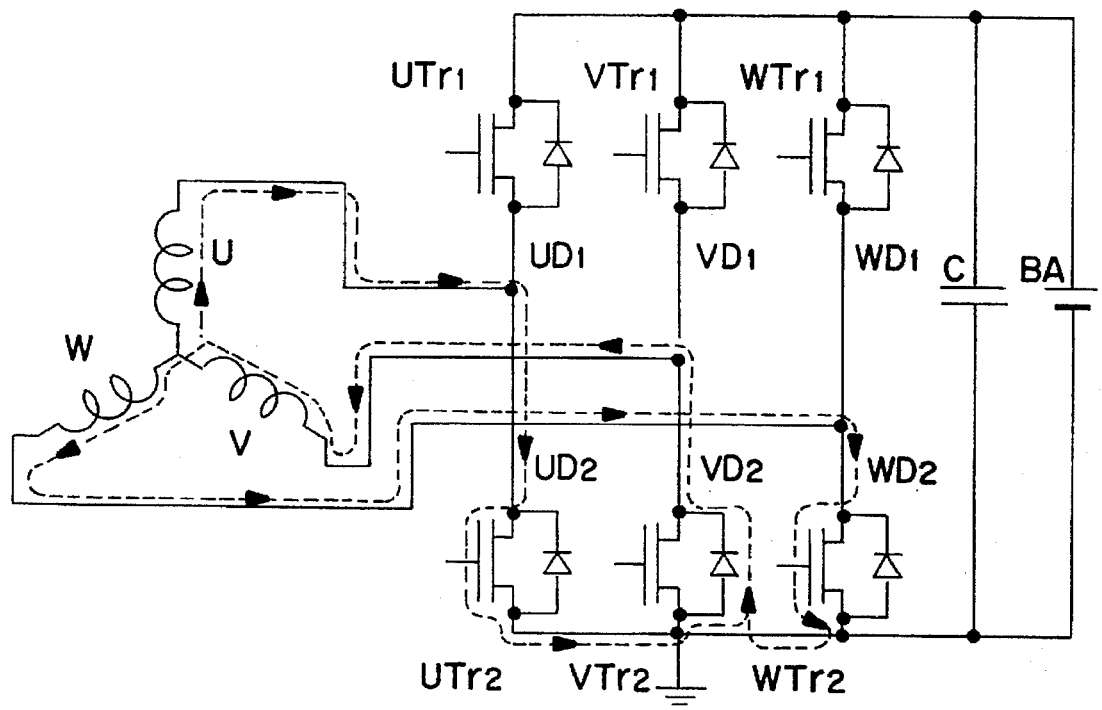
FIG. 11 is a circuit diagram illustrating another motor control system according to the present invention.
Figure 12:
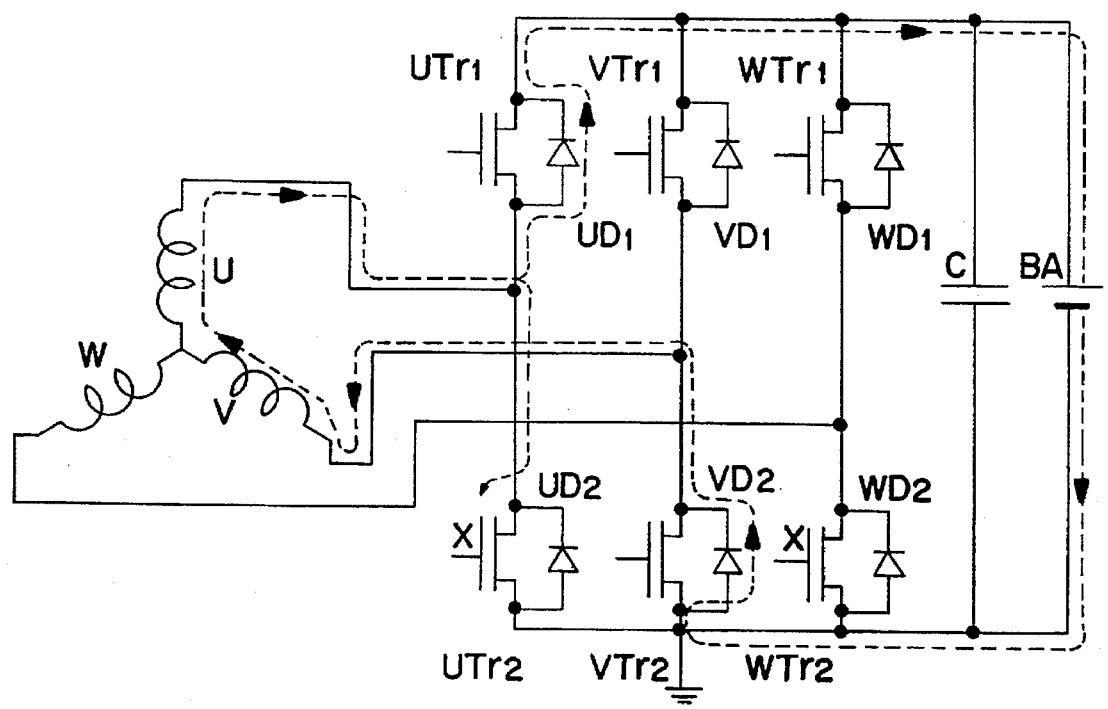
FIG. 12 is a circuit diagram illustrating another motor control system according to the present invention.
Figure 13:
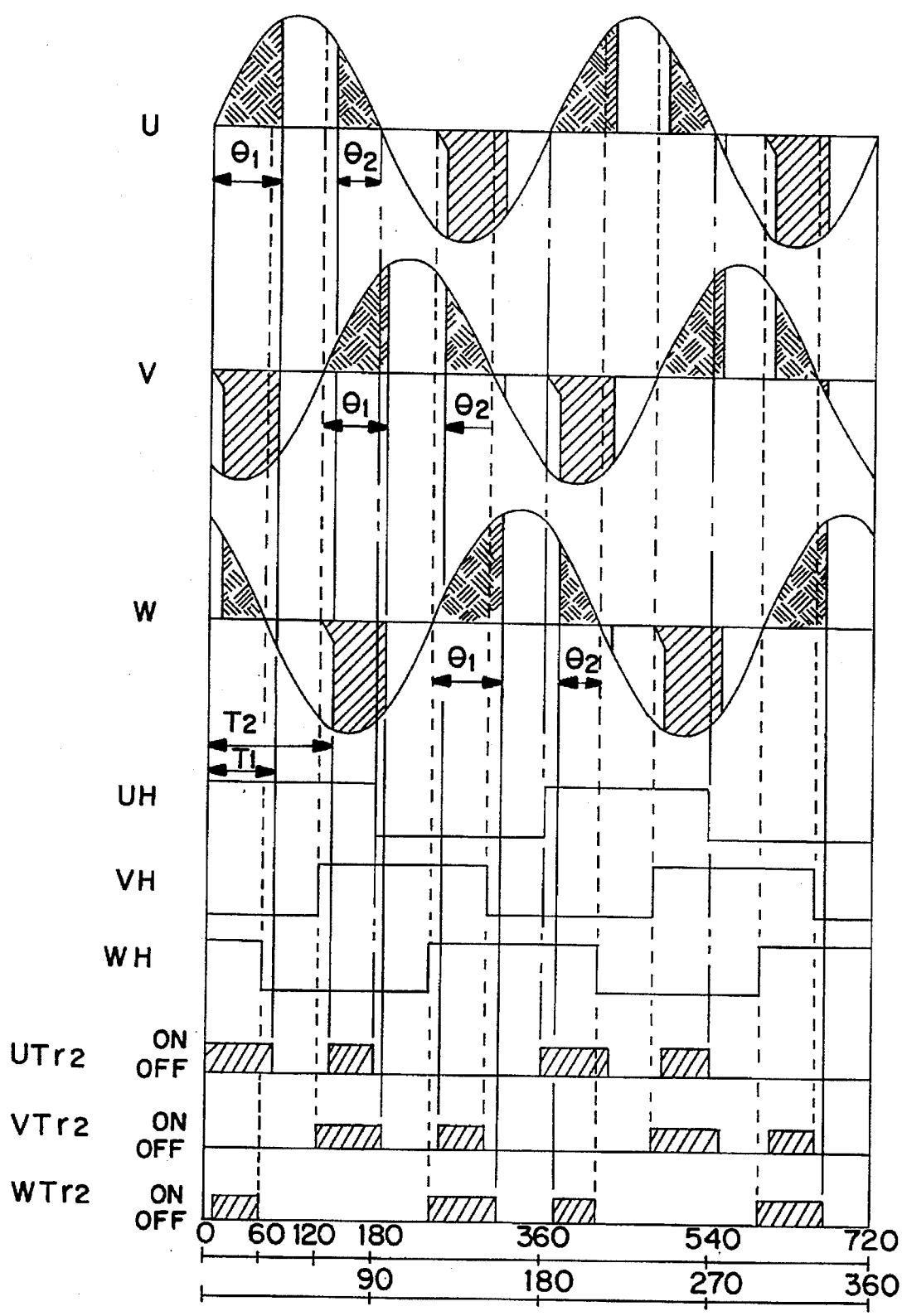
FIG. 13 is a timing diagram illustrating the operation of the motor control systems illustrated in FIGS. 11 and 12.

FIGS. 11 and 12 are circuit diagrams illustrating the principle portion of the motor control system described with reference to FIG. 5. FIG. 13 is a timing diagram of the operations to be carried out by the motor control system.

In FIG. 13, UH, VH, and WH are respective output signals of the Hall-effect devices UH, VH, and WH. Although the DC motor has driving coils U, V, and W in a three phase construction, circuits relating mainly to coil U will be described below because each phase is constructed the same.

During the period corresponding to the angle $\theta_1$, the transistors $UTr_1$ $VTr_1$ and $WTr_1$ are turned OFF and only the transistor $UTr_2$ is switched ON. Therefore, a closed circuit consisting of coil U, transistor $UTr_2$, diode $VD_2$ and coil V and a closed circuit consisting of coil W, transistor $WTr_2$, diode $VD_2$ and coil D are formed as shown in FIG. 11. Accordingly, the electromotive force produced in each coil is converted into heat by the coils, transistors, and diodes, thereby enabling braking.

When the transistor $UTr_2$ is switched OFF at the end of the period corresponding to the angle $\theta_1$, a current induced in each coil will be maintained, and hence, a high voltage will appear across the terminals of each coil. If the voltage appearing across the terminals of each coil is higher than the output voltage of the battery BA, a closed circuit consisting of coil U, diode $VD_1$, battery BA, diode $VD_2$ and coil B is formed so that the battery BA is recharged with the current. Thereafter, neither recharging current nor a braking force is produced until the start of the period corresponding to the angle $\theta_2$.

When the transistor $UTr_2$ is switched ON at the start of the period corresponding to the angle $\theta_2$, the same closed circuit, as described above, is formed for braking. When the transistor $UTr_2$ is switched OFF at the end of the period corresponding to the angle $\theta_2$, no electromotive force is produced in coil U, and hence, no recharging current is induced. Accordingly, if a recharging current is controlled preferentially by angle $\theta_1$ and angle $\theta_2$ is determined so as to supplement a deficiency in the braking force, both the recharging current and the braking force can be controlled individually.

Figure 14:
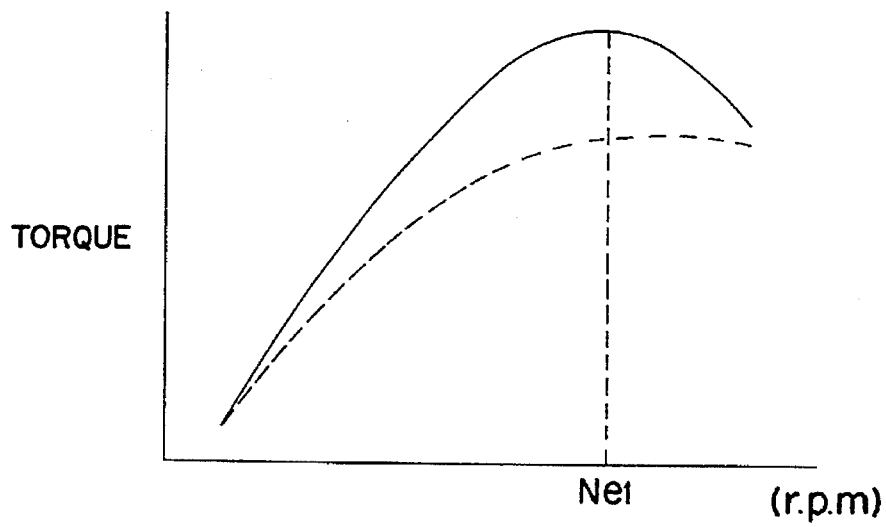
FIG. 14 is a graph showing a relationship between decelerating torque and motor speed.

The decelerating torque in the full regenerative braking mode increases according to the motor speed Ne until the motor speed Ne reaches its peak $Ne_1$, as indicated by the continuous line in FIG. 14. Moreover, the decelerating torque decreases gradually with the increase of the motor speed Ne after the motor speed Ne has exceeded speed $Ne_1$. However, it is desirable that the decelerating torque increases continuously according to the motor speed Ne so that the rate of the motor speed decreases gradually with the increase of the motor speed Ne as indicated by a dotted line in FIG. 14.

Figure 15:
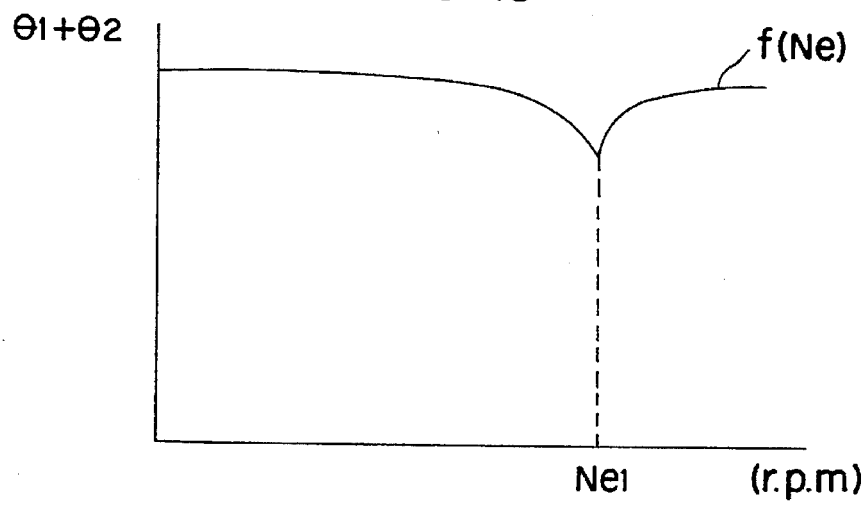
FIG. 15 is a graph showing a relationship between motor speed and an angle($\theta_1+\theta_2$)

In this embodiment of the present invention, angle ($\theta_1$+$\theta_2$) is decreased with the increase of the motor speed Ne until the motor speed Ne reaches the motor speed $Ne_1$ as illustrated in FIG. 15. The angle ($\theta_1$+$\theta_2$) is increased gradually after the motor speed Ne has exceeded speed $Ne_1$ as also illustrated in FIG. 15. This is a function of f(Ne) which characteristic is illustrated by the dotted line in FIG. 14. An ideal decelerating torque characteristic as a function of the motor speed Ne can be attained by such control of the angles $\theta_1$ and $\theta_2$ so that the controllability of the motor speed is improved.

Figure 16:
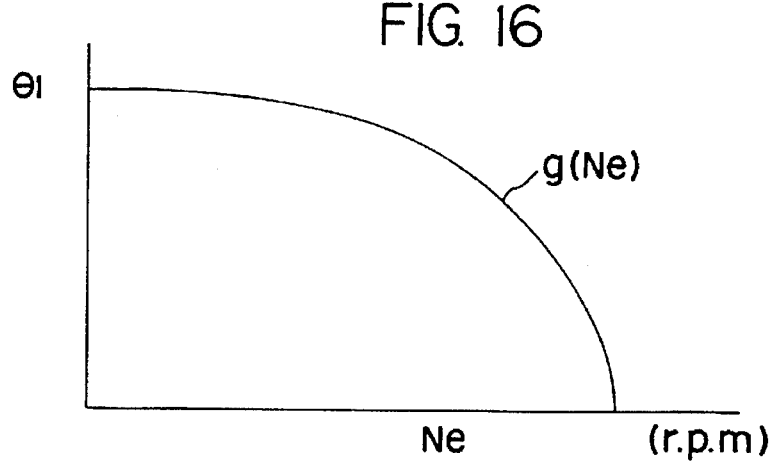
FIG. 16 is a graph showing a relationship between motor speed and an angle $\theta_1$.

Angle $\theta_1$ is decreased gradually with the increase of the motor speed Ne as a function g(Ne) as shown in FIG. 16 so that the voltage of the battery BA is held constant during regenerative braking.

Figure 17:
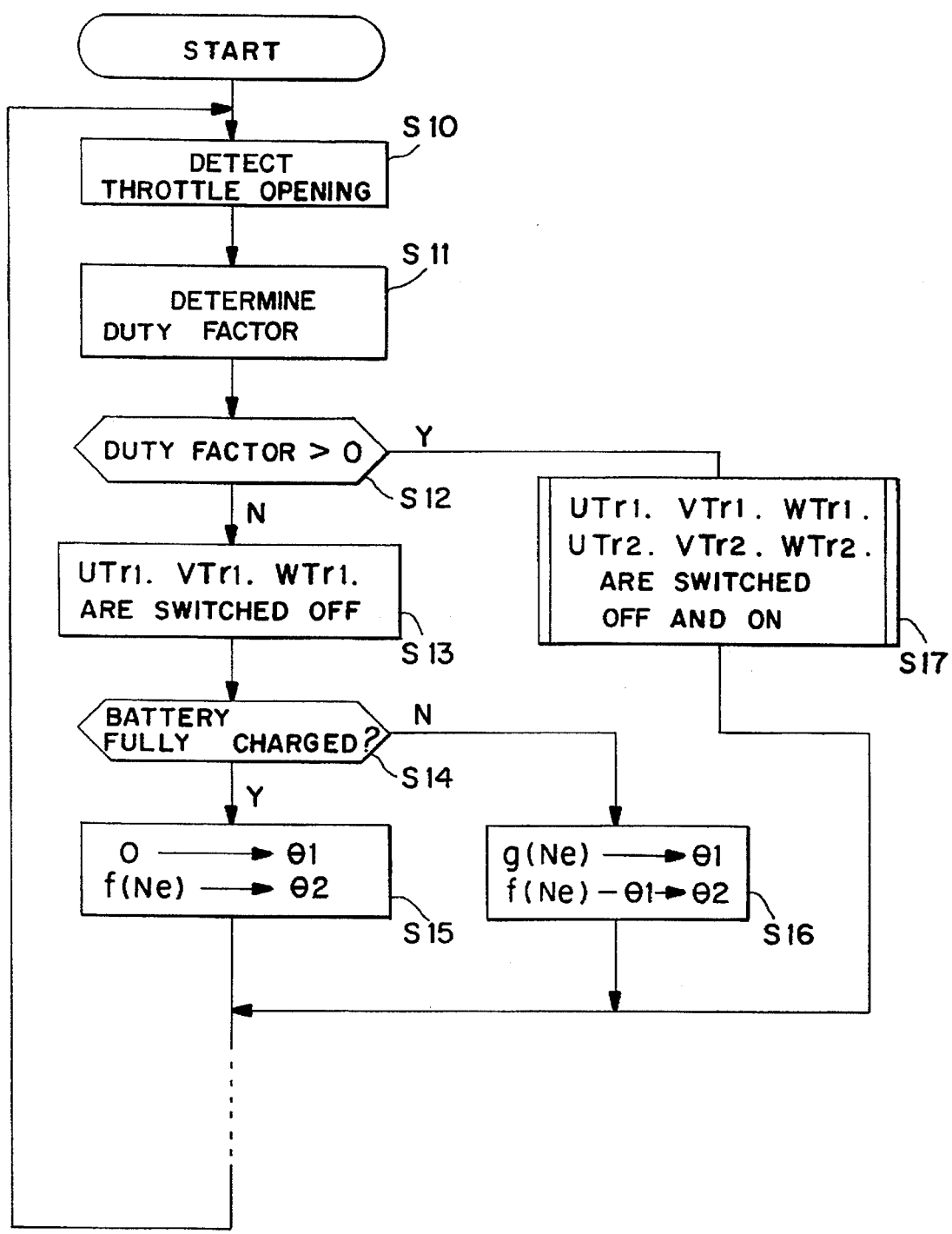
FIG. 17 is a flow chart illustrating a regenerative braking control routine according to the present invention.
Figure 18:
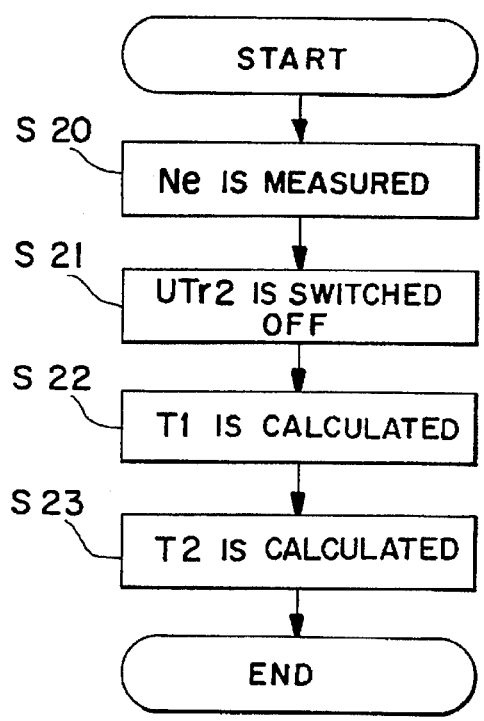
FIG. 18 is a flow chart illustrating an interrupt sub-routine executed during a regenerative braking control routine according to the present invention.
Figure 19:
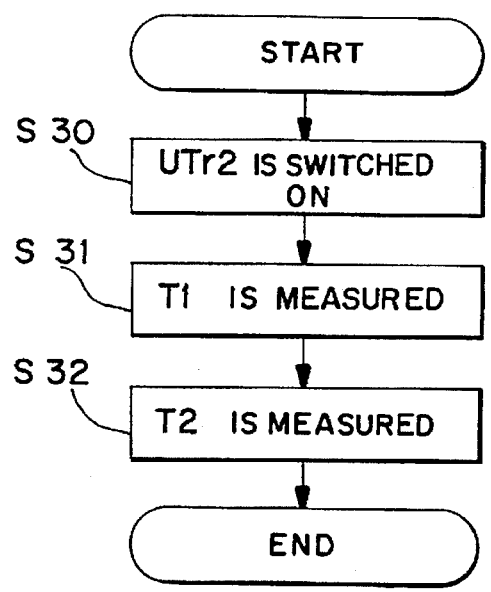
FIG. 19 is a flow chart illustrating an interrupt sub-routine executed during a regenerative braking control routine according to the present invention.
Figure 21A:
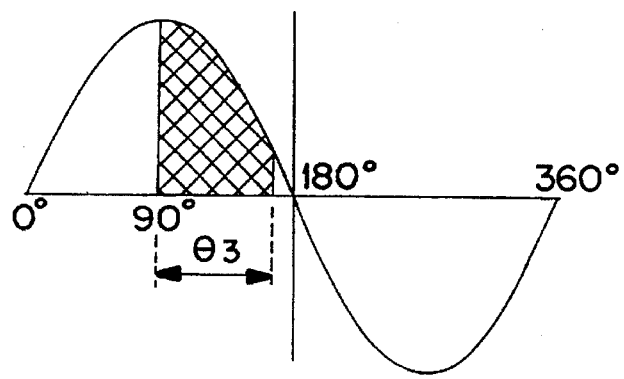
FIGS. 21(a)–21(d) are diagrams illustrating control modes of other embodiments of the present invention.
Figure 21B:
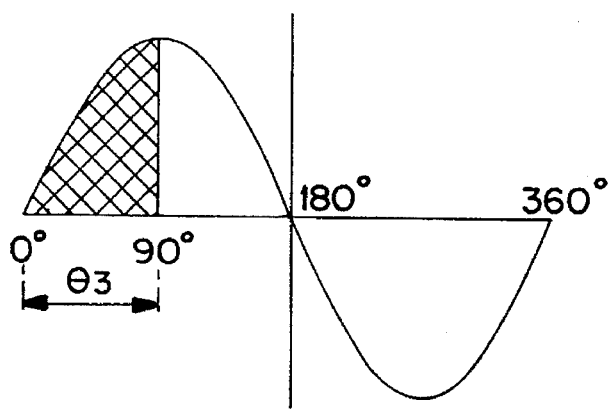
Figure 21C:
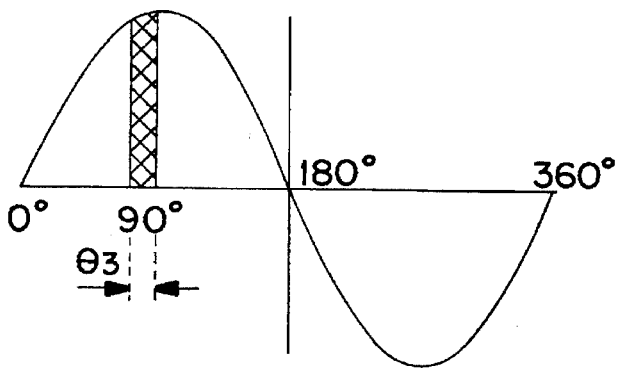
Figure 21D:
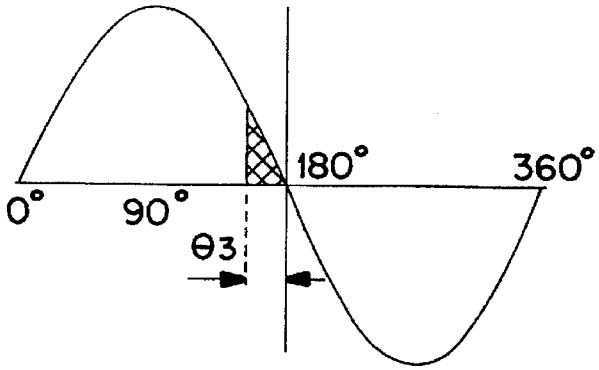

FIG. 17 is a flow chart showing the control of regenerative braking operations. FIGS. 18 and 19 are flow charts illustrating interrupt sub-routines to be executed at predetermined times during the control cycle.

The motor control system starts the control operations when connected to a power supply. In step S10, an accelerator position $\theta_{th}$ is detected, and the driving duty factor is determined on the basis of an accelerator position and the motor speed Me in step S11.

At step S12, it is determined if the driving duty factor is greater than zero. Step S17 is executed if the response in step S12 is affirmative and it is determined that the electric motorcycle is running. Step S13 is executed for regenerative braking if the response in step S12 is negative.

In step S17, the transistors $UTr_1$, $VTr_1$, $WTr_1$, $UTr_2$, $VTr_2$, and $WTr_2$, are switched OFF and ON properly to drive the drive motor. After the execution of step S17, the routine returns to step S10.

In step S13, the transistors $UTr_1$, $VTr_1$, and $WTr_1$ are switched OFF. In step S14, the battery voltage is detected to determine if the battery BA is fully charged. Step S15 is executed if the battery BA is fully charged. Step S16 is executed when the battery BA is not fully charged.

In step S15, the angle $\theta_1$ is set to zero and angle $\theta_2$ is set at an angle determined by the function f(Ne) as shown in FIG. 15.

In step S16, the angle $\theta_1$ is set at an angle determined by the function g(Ne) as shown in FIG. 16. Since the braking force is effective during a period corresponding to angle $\theta_1$, angle $\theta_2$ is set at an angle determined by subtracting the angle $\theta_1$ from the angle determined by the function f(Ne) as illustrated in FIG. 15.

Upon the detection of the leading edge of the output signal of the Hall-effect device UH, the interruption sub-routine of FIG. 18 is executed at step S20 to determine the motor speed Ne and the transistor $UTr_2$ is switched OFF at step S21.

At step S22, a time T1 necessary for setting the angle $\theta_1$ as determined in step S14 or S15 of the main routing is calculated. A time T2 necessary for setting the angle $\theta_2$ is also calculated at step S23.

As shown in FIG. 13, the time T1 corresponds to the angle $\theta_1$, and time T2 corresponds to a time from the detection of the leading edge of the output signal of the Hall-effect device UH to the start of the period corresponding to angle $\theta_2$.

Upon a detection of the leading edge of the output of the signal of the Hall-effect device, UH, the interrupt sub-routine of FIG. 19 is executed. In step S30, the transistor $UTr_2$ is switched ON to start a period corresponding to angle $\theta_1$. The measuring of time T1 is started at step S31, and the measuring of time T2 is started at step S32.

Upon the detection of the termination of the period corresponding to angle $\theta_1$, the transistor $UTr_2$ is turned OFF. Upon the detection of the termination of the period corresponding to angle $\theta_2$, the transistor $UTr_2$ is switched ON again to start the period corresponding to angle $\theta_2$.

Although this embodiment of the present invention determines angle $\theta_1$ as a function of only the motor speed Ne, the angle $\theta_1$ may be a function of the motor speed Ne and the battery voltage.

Figure 20:
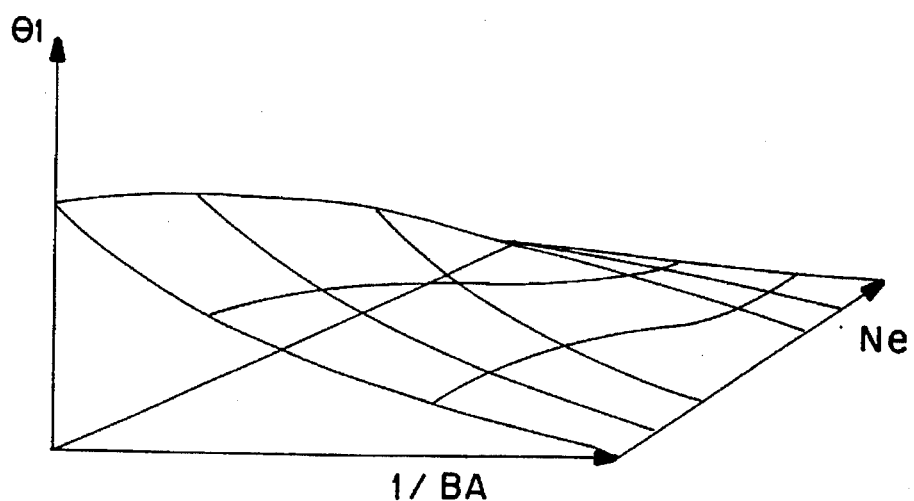
FIG. 20 is a diagram illustrating a method for controlling angle $\theta_1$.

FIG. 20 illustrates a method for control of angle $\theta_1$ in another embodiment of the present invention. This embodiment of the present invention detects the battery voltage, and angle $\theta_1$ is decreased gradually with the increase of the battery voltage. Thus, a recharging current is optimized so that the recharging current is increased when the battery voltage is low or the battery is not charged to its full capacity. The recharging current is decreased when the battery voltage is high or the battery is fully charged. On the other hand, as mentioned above, angle $\theta_2$ is set at an angle determined by subtracting angle $\theta_1$ from an angle determined by the function f(Ne), as shown in FIG. 15, to obtain an optimal braking force and an optimal recharging current.

In this embodiment, the period corresponding to the angle $\theta_1$ is ended in the initial half (before an electrical angle 90°) of a half of a period of the AC voltage induced in the current coil. However, the periods, respectively, corresponding to angles $\theta_1$ or $\theta_2$ may be ended or started at appropriate angles within the range of electric angles 0° to 180°. Furthermore, the electric angle $\theta_1$ or $\theta_2$ may be substituted by a single angle $\theta_3$ which represents a period to be started within a half of a period (a period corresponding to the range of the electrical angle of 0° to 180°) of the AC voltage induced in the coil. The time for starting the period corresponding to angle $\theta_3$ and the time for ending the period corresponding to angle $\theta_3$ may be determined properly so that individual control of the braking force and recharging current can be realized.

FIGS. 21(a)–21(d) illustrate control modes for individually controlling braking force and recharging current by properly setting the angle $\theta_3$. The period corresponding to angle $\theta_3$ is started at an electrical angle nearly equal to an electrical angle of 90° and is ended at an electrical angle nearly equal to an electrical angle of 180° to obtain a high braking force and a low recharging current (FIG. 21(a)). The period corresponding to angle $\theta_3$ is started at an electrical angle nearly equal to an electrical angle of 0° and is ended at an electrical angle nearly equal to an electrical angle of 90° to obtain a high braking force and a high recharging current (FIG. 21(b)). The period corresponding to angle $\theta_3$ is ended at an electrical angle nearly equal to an electrical angle of 90° and is started just before the electrical angle at which the period is ended to obtain a low braking force and a high recharging current (FIG. 21(c)). The period corresponding to angle $\theta_3$ is ended at an electrical angle nearly equal to an electrical angle of 180° and is started just before the electrical angle at which the period is ended to obtain a low braking force and a low recharging current (FIG. 21(d)).

This embodiment of the present invention controls the electrical angle at which the period corresponding to the angle $\theta_3$ is started to control braking force and controls the electrical angle at which the period corresponding to the angle $\theta_3$ is ended to control recharging current. This enables individual determination of the braking force and recharging current.

Angle $\theta_3$ is decreased with the increase of the motor speed Ne until the motor speed Ne reaches the predetermined speed $Ne_1$ and is increased gradually after the motor speed Ne has exceeded the speed $Ne_1$ as mentioned above. In the forgoing embodiments, the transistors $UTr_2$, $VTr_2$, and $WTr_2$ are switched ON during the braking periods, respectively, corresponding to angles $\theta_1$, $\theta_2$, and $\theta_3$. However, when the transistors are controlled in such a manner, the recharging current used to recharge the battery BA is induced only once in the half of a period of the AC voltage at the end of the period corresponding to angle $\theta_1$ or $\theta_3$, and hence, it is impossible to obtain a large recharging current.

Accordingly, in a further embodiment of the present /invention, the transistors $UTr_2$, $VTr_2$, and $WTr2$ are controlled using a chopping mode during the period corresponding to angle $\theta_1$, $\theta_2$, or $\theta_3$ so that the braking period consists of a plurality of intermittent short braking periods. Thus, the frequency of inducing a current is increased to obtain a higher recharging current.

Figure 28:
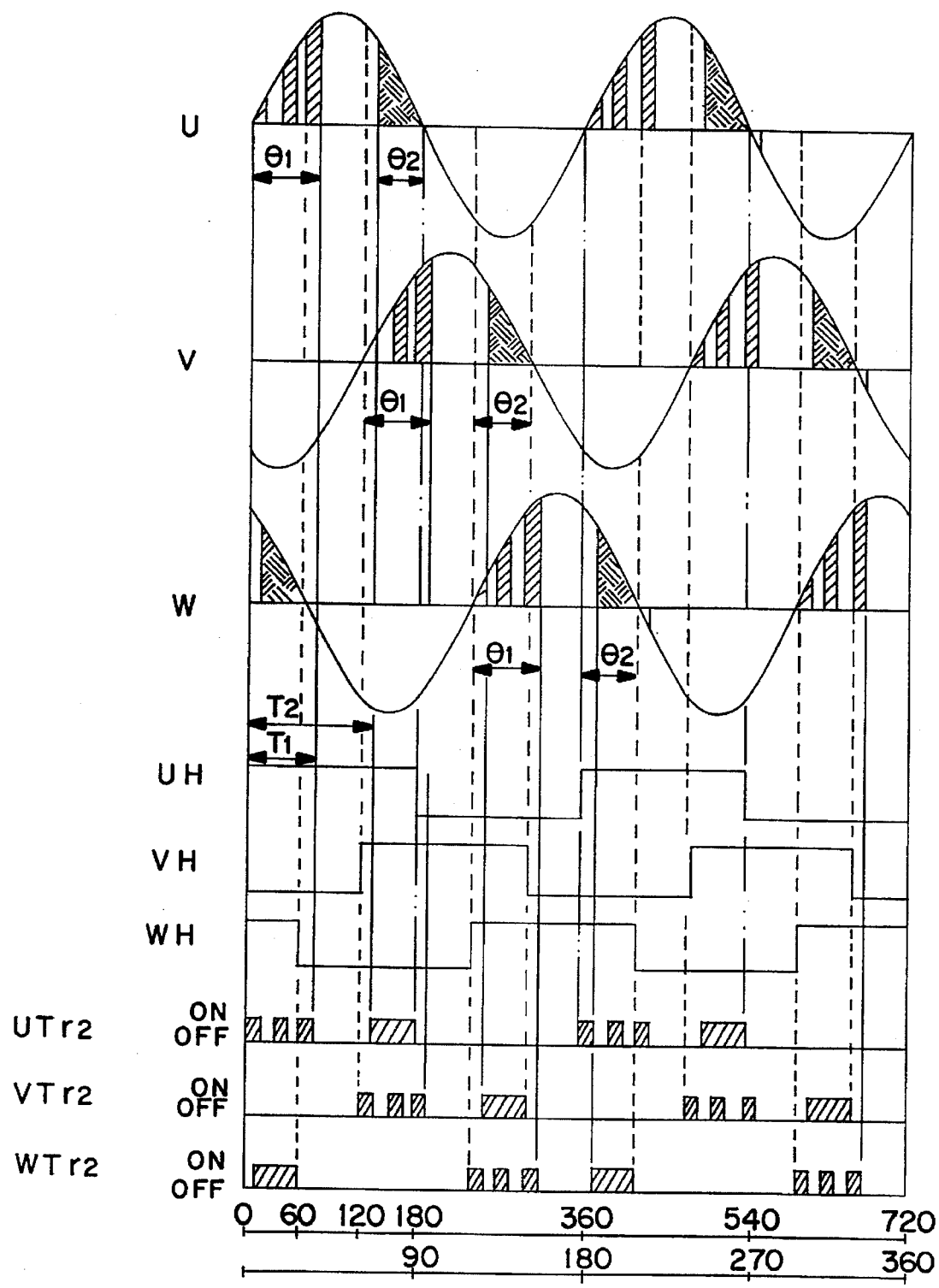
FIG. 28 is a timing diagram illustrating a chopping control method according to another embodiment of the present invention.

FIG. 28 is a timing diagram showing the chopping control of the transistor $UTr_2$, $VTr_2$, and $WTr_2$, corresponding to angle $\theta_1$. This embodiment increases the frequency of the inducing current and the braking period corresponding to angle $\theta_1$, thereby increasing the recharging current substantially by chopping the control of the transistors $UTr_2$, $VTr_2$, and $WTr_2$ corresponding to angle $\theta_1$.

It is also possible to increase the recharging current substantially by increasing the inducing current in the period corresponding to angle $\theta_3$ by chopping the control of transistors UTr2, VTr2, and WTr2 during the braking period corresponding to angle $\theta_3$. It is desirable to execute this chopping control as explained above only when a high recharging current is necessary. Thus, the chopping control should be avoided when a low recharging current is necessary. Furthermore, if a higher recharging current is necessary, the chopping control may be executed in the period corresponding to angle $\theta_2$ in addition to the chopping control and the periods corresponding to angles $\theta_1$ and $\theta_3$.

Figure 29:
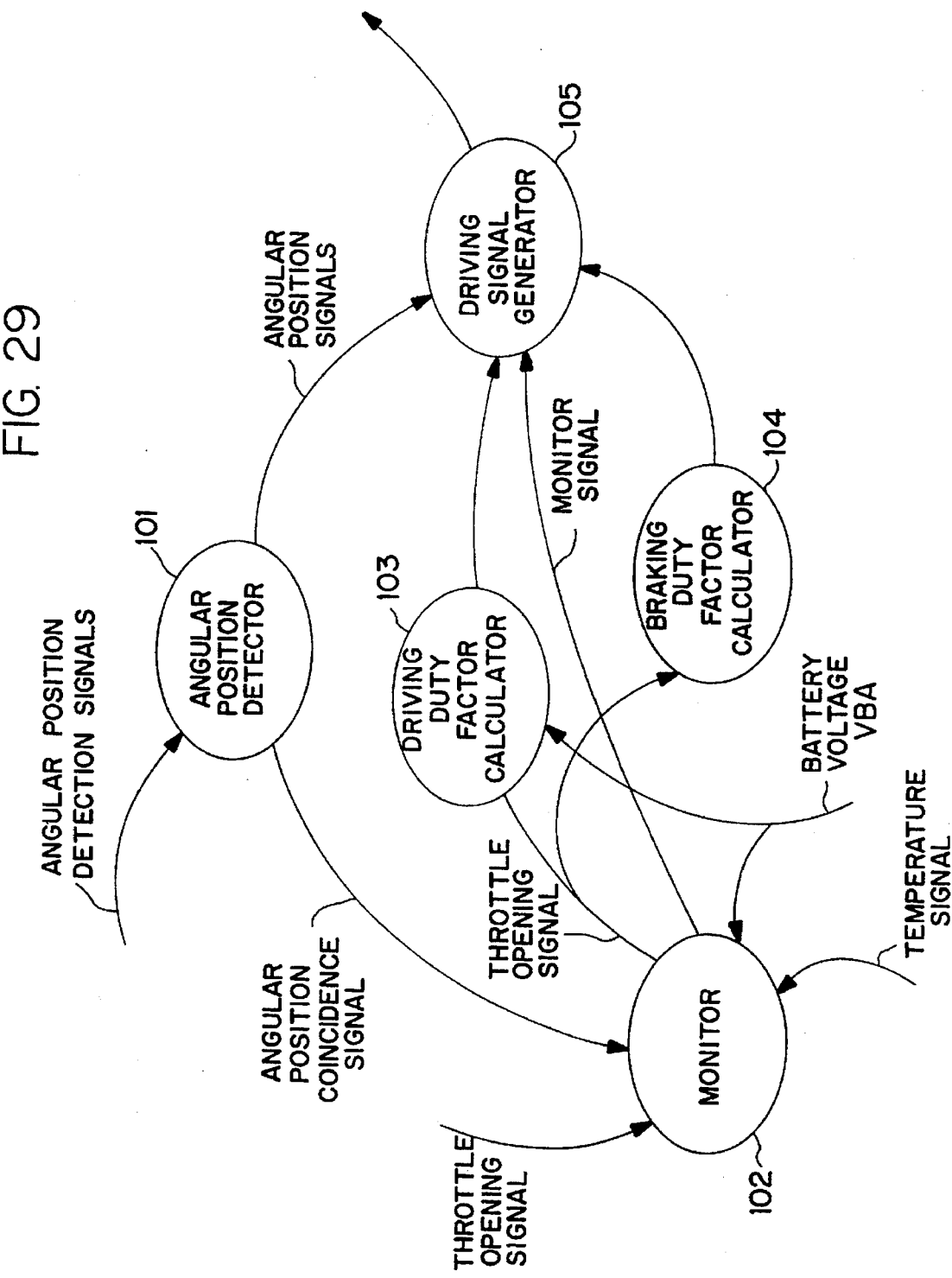
FIG. 29 is a block diagram of a third embodiment of the present invention.
Figure 34:
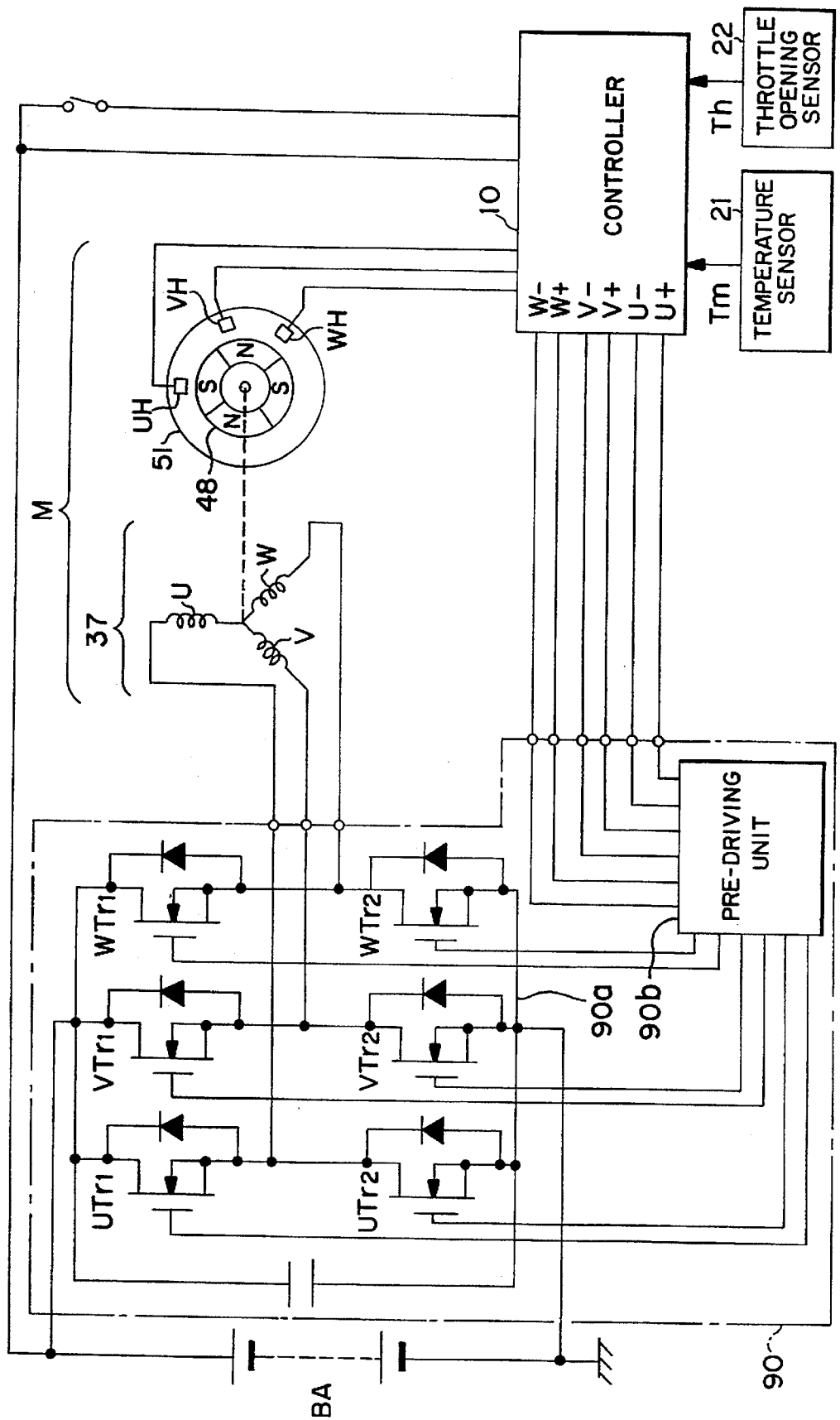
FIG. 34 is a block diagram of an electric control system employed in an electric vehicle.

FIG. 29 is a block diagram showing the functions of a portion of a controller in another preferred embodiment of the present invention corresponding to the controller 10 as previously described with reference to FIG. 34.

An angular position detecting device 101 determines the angular position of the rotor on the basis of the angular position detection signals provided by angular position sensors and generates an angular position signal for a driving signal output device 105. If the angular position detection signals provided by the angular position sensors are all the same, the angular position detecting device 101 produces an angular position coincidence signal and feeds this coincidence signal to a monitor 102. When either the angular position coincidence signal, an accelerator position signal TH representing the position of an accelerator being outside a reference range, a temperature signal TM representing a temperature of the drive motor being higher than an upper limit temperature, or a signal representing the output voltage of a battery being lower than a lower limit is fed to the monitor 102, the monitor 102 produces a monitor signal for the driving signal output device 105 and feeds the input accelerator position signal TH to a driving duty factor determining device 103 and a braking duty factor determining device 104.

FIG. 32 illustrates an accelerator position sensor. A potentiometer 143 is connected operatively to a throttle grip 141. The resistance of the potentiometer varies according to the angular position of the throttle grip 41. The output voltage of the potentiometer 143 is fed as the accelerator position signal TH to the driving signal output device 105. The angular turning range of the throttle grip 141 is defined by stoppers 142a and 142b so that the output voltage of the potentiometer 143 is in a range of, for example, 0.5 volts to 4.5 volts. Accordingly, if a voltage outside the range of the potentiometer 143 is detected by the driving signal output device 105, it is determined that the accelerator position sensor is not functioning normally.

Figure 37:
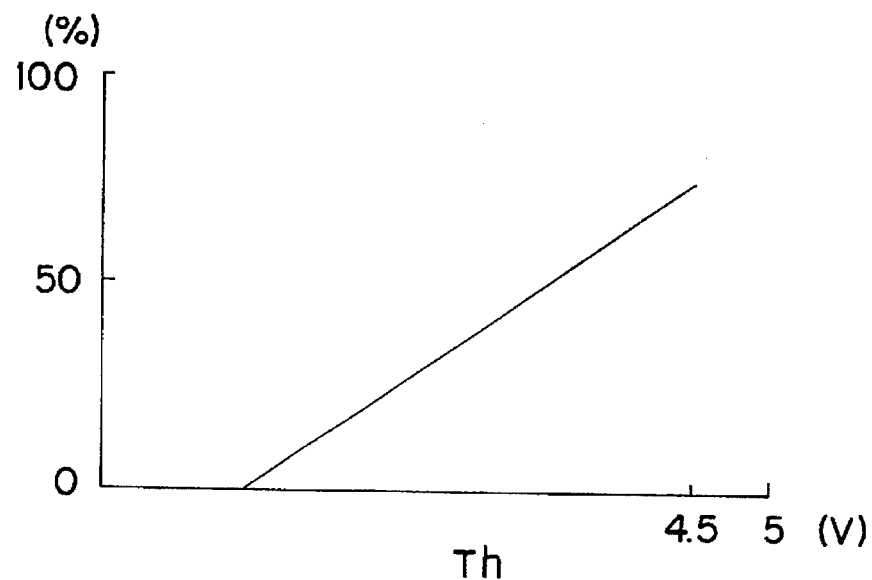
FIG. 37 is a graph illustrating a relationship between a driving duty factor and a throttle opening signal.
Figure 38:
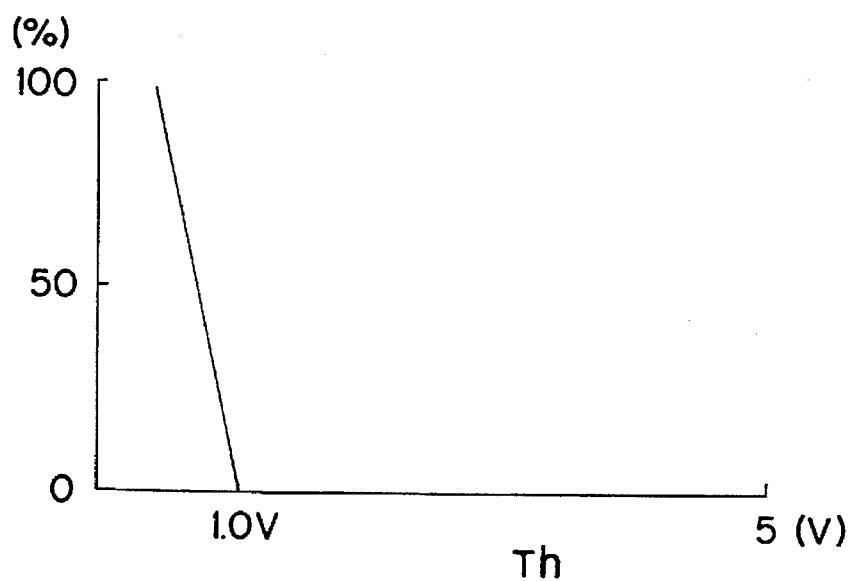
FIG. 38 is a graph illustrating a relationship between a braking duty factor and a accelerator position signal.

The driving duty factor determining device 103 and the brake duty factor determining device 104 determines the driving duty factor and the brake duty factor, respectively, on the basis of the accelerator position signal TH as shown in FIGS. 37 and 38. The driving signal output device 105 switches ON and OFF the transistors of a driver 90 according to the angular position of the rotor, the driving duty factor, the braking duty factor, and the monitor signal.

Figure 30:
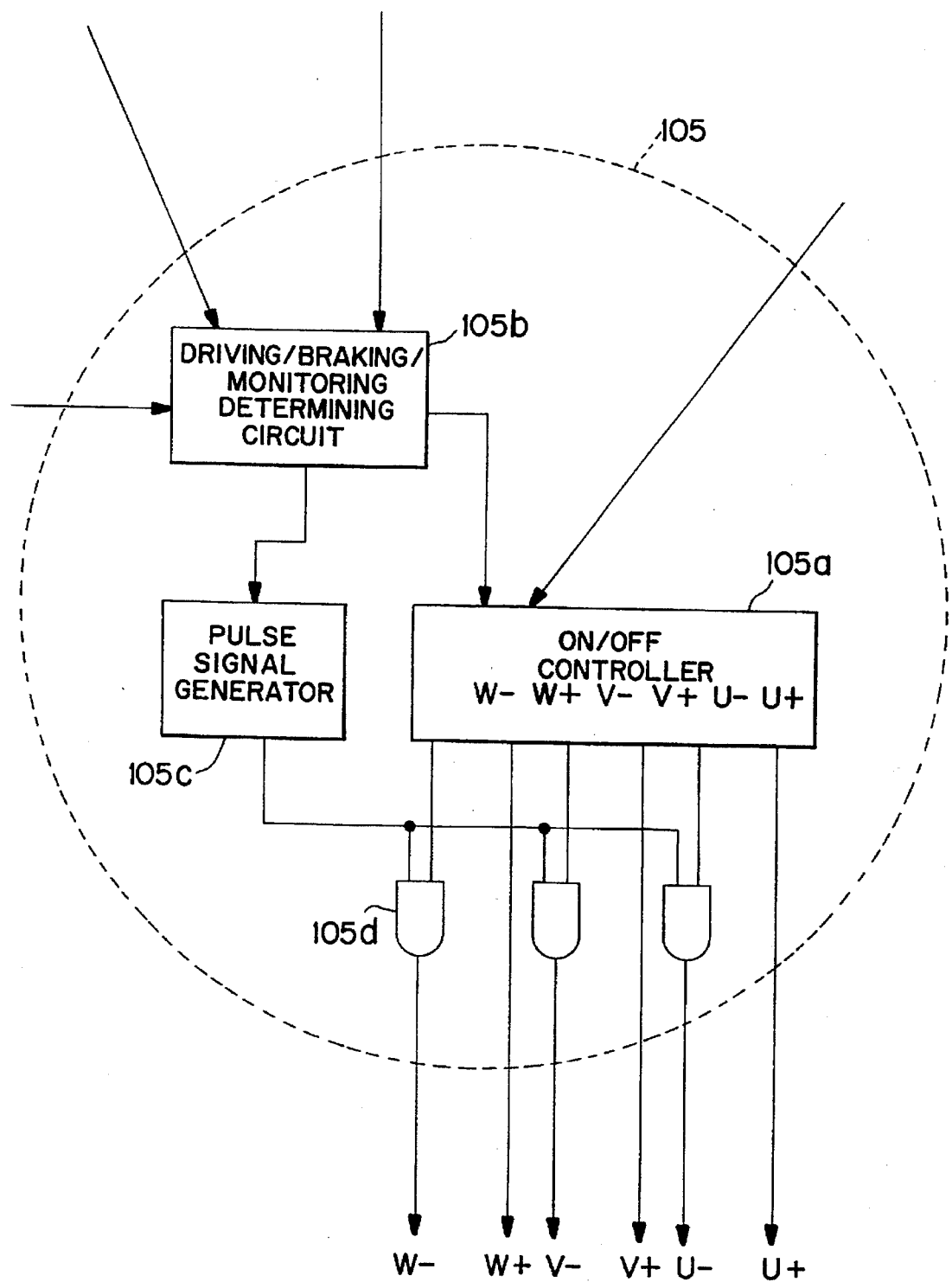
FIG. 30 is a block diagram of the driving signal output device illustrated in FIG. 29.
Figure 31:
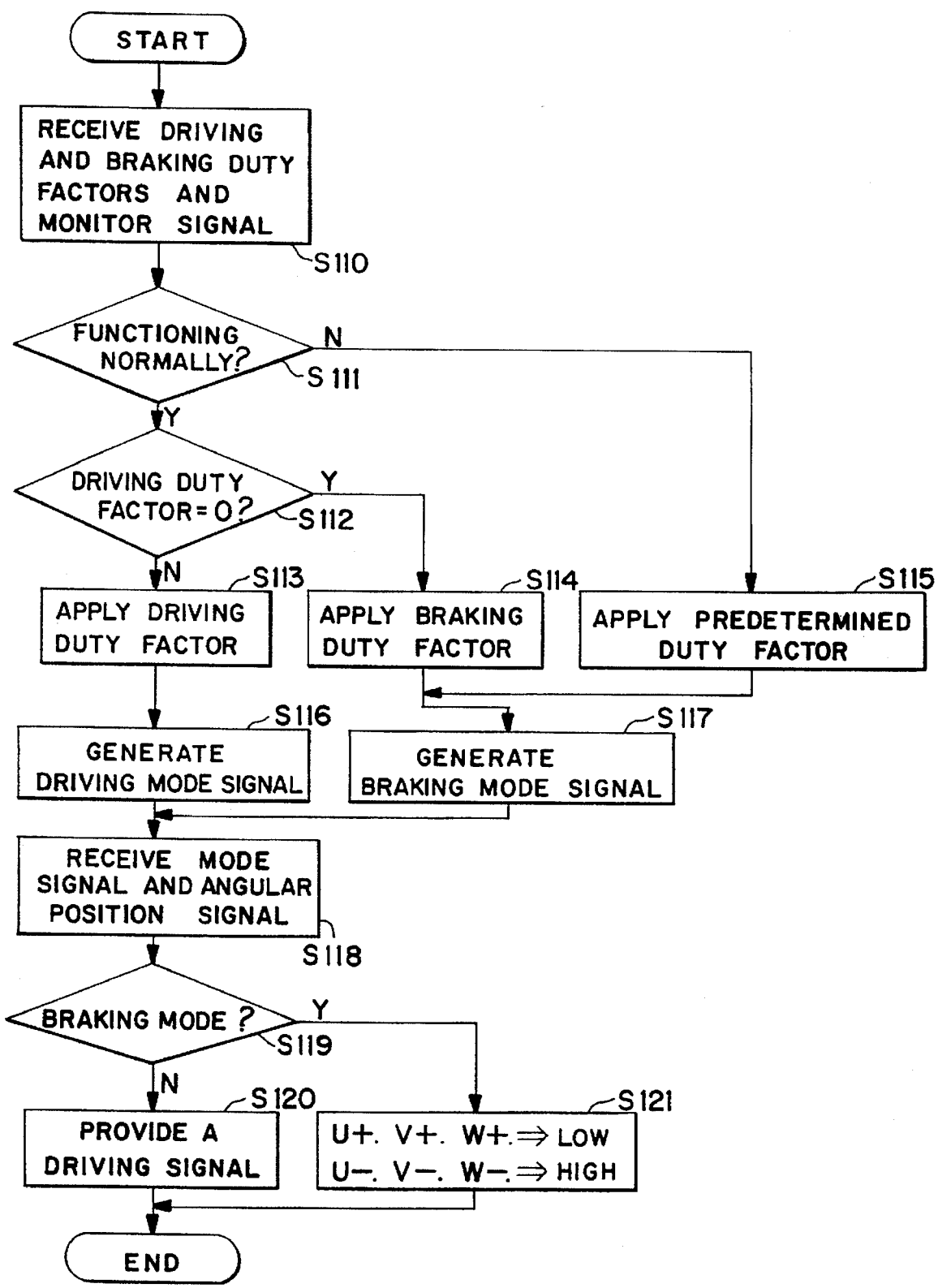
FIG. 31 is a flow chart illustrating the operations of the driving signal output device of FIG. 29.

FIG. 30 is a block diagram of the driving signal output device 105, and FIG. 31 is a flow chart illustrating the operations of the driving signal output device 105.

In step S110, a driving duty factor, a braking duty factor, and a monitor signal are fed to a driving/braking/monitoring determining device 105b. At step S111, it is determined, on the basis of the monitor signal, if an electric control system for controlling the drive motor is functioning normally. If the electric control system is functioning normally, it is determined at step S112 if the driving duty factor is zero.

If the determination at step S112 is negative, the driving duty factor is fed as an output duty factor from a pulse signal generating device, 105c, to AND gates 105d in step S113. At step S116, a driving mode signal, i.e., a mode signal indicating a driving mode, is fed to an ON/OFF decision device 105a.

If the determination in step S112 is affirmative (the driving duty factor is zero), the braking duty factor (Step S114) is fed as an output duty factor to the pulse signal generating device 105c. The pulse signal generating device 105c applies a pulse signal having the braking duty factor to AND gates 105d.

If the determination in step S111 is negative (the electric control system is not functioning normally), a predetermined duty factor (Step S115) is fed to the pulse signal generating device 105c. The pulse signal generating device 105c then applies a pulse signal having the predetermined duty factor to AND gates 105d.

In step S117, a braking mode signal, a mode signal indicating a braking mode, is fed to the ON/OFF decision device 105a.

In step S118, the ON/OFF decision device 105a receives the mode signal and the angular position signal. In step S119, it is determined whether the mode signal is a braking mode signal. If the determination of step S119 is affirmative, step S121 is executed so as to set the driving signals U+, V+, and W+ to be low and driving signals U−, V−, and W− as high. Consequently, only the transistors UTr$_2$, VTr$_2$, and WTr$_2$ of the driver 90 are switched ON for electrical braking.

On the other hand, if the mode signal is a driving mode signal, a driving signal described with respect to FIG. 36 is provided at step S120. Consequently, the AND gates 105d provide a pulse signal having the predetermined duty factor to control the ON/OFF of the transistors.

The electric vehicle is braked electrically by regenerative braking or dynamic braking when the electric control system for controlling the drive motor is not functioning normally. Accordingly, the electric vehicle can be decelerated in a satisfactory manner even if a portion of the electric control system malfunctions while the electric vehicle is running. Incidentally, the controller in this embodiment of the present invention starts the braking operation upon the detection of the malfunction of the portion of the electric control system.

However, in some cases, it is more preferable to maintain the running mode than to brake the electric vehicle immediately under a condition that will not effect normal portions of the electric control system, such as a condition in which the temperature of the driving motor has increased beyond a normal temperature or a condition in which the output voltage of the battery has dropped below a normal voltage.

A controller for an electric vehicle, according to another embodiment of the present invention, maintains the present running mode for a while after the malfunction of the portion of the electric control system has been detected.

FIGS. 33(a)–33(c) are diagrams illustrating the controller of this embodiment of the present invention in which FIG. 33(a) illustrates the variation of the accelerator position signal TH representing the position of the accelerator with time, FIG. 33(b) illustrates the variation of the correction factor K for multiplying the accelerator position signal TH with time, and FIG. 33(c) illustrates a variation of a corrected output obtained by multiplying the accelerator position signal TH by the correction coefficient with time.

In this embodiment, the accelerator position signal TH is multiplied by the correction factor K which decreases gradually from 100% after the detection of the malfunction of a portion of the electric control system. The power supplied to the drive motor is controlled on the basis of the corrected accelerator position signal. Although the power supplied to the drive motor is decreased gradually after the detection of the malfunction of the portion of the electric control system, the controllability is not significantly effected because to control to drive motor according to the operations of the throttle is possible.

Accordingly, it is possible to move the electric vehicle to a desired place by operating the accelerator even after the malfunction of a portion of the electric control system. The electric vehicle can satisfactorily be decelerated by electrically braking the electric vehicle in the braking mode as described above even if a portion of the electric control system malfunctions while the electric vehicle is running.

As is apparent from the description given above, the present invention has the following effects.

The preferential control of the recharging current through the control of time at which a period corresponding to $\theta_1$ is to be ended and the control of time at which a period corresponding to the angle $\theta_2$ is to be started so that inefficient braking force obtained during the period corresponding to the angle is supplemented, thereby enabling the individual determination of the braking force and individually controlling the recharging energy during the regenerated braking mode.

The control of the recharging current through the control of time at which a period corresponding to the angle $\theta_3$ is to be ended and the control of the braking force through the control of the time at which the period corresponding to angle $\theta_3$ is to be started enables individual control of the braking force and recharging energy during the regenerative braking mode.

The chopping control of the transistors during the periods, respectively, corresponding to angles $\theta_1$, $\theta_2$, and $\theta_3$ and the control of the braking force through the control of the starting time, increases the frequency at which the induced current is produced, thereby enhancing the recharging current.

The electric vehicle can be satisfactorily decelerated even if a portion of the electric control system malfunctions while the vehicle is running because the electric vehicle is braked electrically when a portion of the electric control system controlling the drive motor malfunctions.

The controllability is not significantly hindered and appropriate measures can be taken when the electric control system malfunctions because a throttle opening signal is multiplied by a correction coefficient which gradually decreases. The power supplied to the drive motor is controlled according to the corrected throttle opening signal after the malfunction of the electric control system.

While only certain embodiments of the present invention have been described, it will be apparent to those skilled in the art that various charges and modifications may be made therein without departing from the spirit and scope of the present invention as set forth in the claims below.

What is claimed is:

1. A controller for an electric vehicle driven by an electric motor, a speed of which is controlled according to a voltage, said controller comprising:

an accelerator position sensor for sensing an angular position of an accelerator, said angular position being used for determining a voltage to be supplied to the electric motor;

monitor means for monitoring functions of the electric vehicle to detect a malfunction therein, said functions including battery voltage, electric motor temperature, electric motor angular position, and accelerator angular position;

braking duty factor determining means for receiving an accelerator angular position input signal from said monitor means when the malfunction is detected by said monitor means, said braking duty factor determining means calculating a braking duty factor according to said accelerator angular position input signal; and correcting means for receiving said braking duty factor and generating a corrected voltage according to said braking duty factor by gradually decreasing the voltage supplied to the electric motor when the malfunction is detected by said monitor means;

said correcting means supplying said corrected voltage to the electric motor when the malfunction is detected.

2. The controller as claimed in claim 1, further comprising:

electric braking means for electrically braking the electric motor.

3. The controller as claimed in claim 2, wherein said electric braking is dynamic braking.

4. The controller as claimed in claim 2, wherein said electric braking is regenerative braking.

5. The controller as claimed in claim 2, further comprising:

means for applying a series of pulse signals to said electrical braking means to effectuate a brake force; and means for changing a pulse width of said pulse signals, with said brake force being proportional to said pulse width of said pulse signals.

6. The controller as claimed in claim 2, wherein said monitor means monitors operation of said controller, and actuates said electric braking means when said monitor means detects improper operation of said controller.

7. The controller as claimed in claim 2, wherein said electric braking means is actuated when said corrected voltage decreases to zero volts.

8. A method for controlling an electric vehicle driven by an electric motor, a speed of which is controlled according to a voltage, said method comprising the steps of:

sensing an angular position of an accelerator, said angular position being used for determining a voltage to be supplied to the electric motor;

monitoring functions of the electric vehicle to detect a malfunction therein, said functions including battery voltage, electric motor temperature, electric motor angular position, and accelerator angular position;

providing braking duty factor determining means for receiving an accelerator angular position input signal from said monitor means when the malfunction is detected by said monitor means;

calculating a braking duty factor according to said accelerator angular position input signal;

generating a corrected voltage according to said braking duty factor by gradually decreasing the voltage supplied to the electric motor when the malfunction is detected; and supplying the corrected voltage to the electric motor when the malfunction is detected.

9. The method as claimed in claim 8, further comprising the step of electrically braking the electric motor by applying a series of pulse signals to electrical braking means to effectuate a brake force proportional to a pulse width of said pulse signals when the malfunction is detected.

10. The method as claimed in claim 8, further comprising the step of:

electrically braking the electric motor when the corrected voltage is zero volts.

11. The method as claimed in claim 10, wherein the electrical braking is dynamic braking.

12. The method as claimed in claim 10, wherein the electrical braking is regenerative braking.

13. The controller as claimed in claim 1, wherein said correcting means multiplies the sensed angular position of the accelerator by said braking duty factor which decreases gradually from 100%.

* * * * *